US011992815B2

(12) United States Patent
Tang et al.

(10) Patent No.: US 11,992,815 B2
(45) Date of Patent: May 28, 2024

(54) AQUAPORIN BASED THIN FILM COMPOSITE MEMBRANES

(75) Inventors: Chuyang Tang, Singapore (SG); Changquan Qiu, Singapore (SG); Yang Zhao, Singapore (SG); Wenming Shen, Singapore (SG); Ardcharaporn Vararattanavech, Singapore (SG); Rong Wang, Singapore (SG); Xiao Hu, Singapore (SG); Jaume Torres, Singapore (SG); Anthony Fane, Singapore (SG); Claus Helix-Nielsen, Copenhagen N (DK)

(73) Assignee: NANYANG TECHNOLOGICAL UNIVERSITY, Singapore (SG)

( * ) Notice: Subject to any disclaimer, the term of this patent is extended or adjusted under 35 U.S.C. 154(b) by 0 days.

(21) Appl. No.: 14/346,276

(22) PCT Filed: Mar. 2, 2012

(86) PCT No.: PCT/SG2012/000063
§ 371 (c)(1),
(2), (4) Date: Jul. 14, 2014

(87) PCT Pub. No.: WO2013/043118
PCT Pub. Date: Mar. 28, 2013

(65) Prior Publication Data
US 2014/0332468 A1    Nov. 13, 2014

Related U.S. Application Data

(60) Provisional application No. 61/537,376, filed on Sep. 21, 2011.

(51) Int. Cl.
| | | |
|---|---|---|
| *B01D 71/80* | (2006.01) | |
| *B01D 61/00* | (2006.01) | |
| *B01D 61/02* | (2006.01) | |
| *B01D 67/00* | (2006.01) | |
| *B01D 69/12* | (2006.01) | |
| *B01D 69/14* | (2006.01) | |
| *B01D 71/56* | (2006.01) | |
| *B01D 71/68* | (2006.01) | |
| *B01D 71/70* | (2006.01) | |

(52) U.S. Cl.
CPC ............ *B01D 71/80* (2013.01); *B01D 61/00* (2013.01); *B01D 67/0006* (2013.01); *B01D 69/12* (2013.01); *B01D 69/125* (2013.01); *B01D 69/144* (2013.01); *B01D 71/56* (2013.01); *B01D 71/68* (2013.01); *B01D 61/002* (2013.01); *B01D 61/025* (2013.01); *B01D 61/027* (2013.01); *B01D 71/70* (2013.01); *B01D 2323/40* (2013.01)

(58) Field of Classification Search
None
See application file for complete search history.

(56) References Cited

U.S. PATENT DOCUMENTS

| | | | |
|---|---|---|---|
| 7,208,089 B2 | 4/2007 | Montemagno et al. | |
| 7,857,978 B2 | 12/2010 | Jensen et al. | |
| 2010/0224555 A1* | 9/2010 | Hoek | B01D 69/148 210/500.42 |
| 2010/0323573 A1* | 12/2010 | Chu | B01D 71/08 442/153 |
| 2011/0020950 A1 | 1/2011 | Vogel et al. | |
| 2011/0046074 A1* | 2/2011 | Kumar | B01D 67/0006 514/21.2 |
| 2011/0220569 A1* | 9/2011 | Mickols | B01D 67/0093 210/500.33 |
| 2011/0284456 A1* | 11/2011 | Brozell | B01D 69/122 210/500.21 |

FOREIGN PATENT DOCUMENTS

| | | | | |
|---|---|---|---|---|
| CA | 2765768 A1 | * | 12/2010 | .......... A61M 1/1654 |
| KR | 10-2010-0116344 A | | 11/2010 | |
| KR | 20100116344 A | * | 11/2010 | |
| KR | 20100116344 A1 | * | 11/2010 | |
| WO | 2009/076174 A1 | | 6/2009 | |
| WO | 2010/091078 A2 | | 8/2010 | |

OTHER PUBLICATIONS

Elimelech, M. et al. The future of seawater desalination: energy, technology, and the environment. Science 333, 712, Aug. 5, 2011, p. 712-717.*
Vist, MR and Davis, JH. Phase equilibria of cholesterol/dipalmitoylphosphatidylcholine mixtures: 2H nuclear magnetic resonance and differential scanning calorimetry. Biochemistry 1990, 29, p. 451-465.*
Lodish et al. "Section 5.3: Biomembranes: Structural Organization and Basic Functions", Molecular Cell Biology, 4th edition, New York: WH Freeman, 2000 (Year: 2000).*
Dow Filmtec (Dow Filmtec DataSheet; Pure Aqua, Inc., <URL: https://pureaqua.com/dow-filmtec-nanofiltration-membrane-elements-8-inch/>; accessed Feb. 23, 2023). (Year: 2023).*
Achilli et al., "The forward osmosis membrane bioreactor: A low fouling alternative to MBR processes," *Desalination* 239:10-21, 2009.
Agre et al., "The Aquaporins, Blueprints for Cellular Plumbing Systems," *The Journal of Biological Chemistry* 273(24):14659-14662, 1998.
Borgnia et al., "Cellular and Molecular Biology of the Aquaporin Water Channels," *Annu. Rev. Biochem.* 68:425-458, 1999.
Borgnia et al., "Functional Reconstitution and Characterization of AqpZ, the *E. coli* Water Channel Protein," *J. Mol. Biol.* 291:1169-1179, 1999.
Carafa et al., "Designing novel pH-sensitive non-phospholipid vesicle: Characterization and cell interaction," *European Journal of Pharmaceutical Sciences* 28:385-393, 2006.

(Continued)

*Primary Examiner* — Ryan B Huang
(74) *Attorney, Agent, or Firm* — Seed IP Law Group LLP

(57) ABSTRACT

Present invention relates to a thin film composite membrane wherein a thin selective layer, having incorporated amphiphilic vesicles, is supported by a microporous substrate. A process of preparing the thin film composite membrane and its use are also disclosed.

10 Claims, 9 Drawing Sheets

(56) References Cited

OTHER PUBLICATIONS

Chapman et al., "Lipid Phase Transitions In Model Biomembranes—The Effect of Ions on Phosphatidylcholine Bilayers," *Biochmica et Biophysica Acta 464*:260-275, 1977.

Chen et al., "The Influence of Cholesterol on Phospholipid Membrane Curvature and Bending Elasticity," *Biophysical Journal 73*:267-276, 1997.

Dova et al., "On the direct osmotic concentration of liquid foods. Part I: Impact of process parameters on process performance," *Journal of Food Engineering 78*:422-430, 2007.

Dova et al., "On the direct osmotic concentration of liquid foods: Part II. Development of a generalized model," *Journal of Food Engineering 78*:431-437, 2007.

González-Pérez et al., "Biomimetic Triblock Copolymer Membrane Arrays: A Stable Template for Functional Membrane Proteins," *Langmuir 25*(18):10447-10450, 2009.

Hansen et al., "Interaction between sodium dodecyl sulfate and membrane reconstituted aquaporins: A comparative study of spinach SoPIP2; 1 and *E. coli* AqpZ," *Biochimica et Biophysica Acta 1808*:2600-2607, 2011.

Hovijitra et al., "Cell-Free Synthesis of Functional Aquaporin Z in Synthetic Liposomes," *Biotechnology and Bioengineering 104*(1):40-49, 2009.

Huster et al., "Water Permeability of Polyunsaturated Lipid Membranes Measured by $^{17}O$ NMR," *Biophysical Journal 73*:855-864, 1997.

Ibragimova et al., "Hydrogels for in situ encapsulation of biomimetic membrane arrays," *Polym. Adv. Technol. 23*:182-189, 2012.

Jacobson et al., "Phase Transitions and Phase Separations in Phospholipid Membranes Induced by Changes in Temperature, pH, and Concentration of Bivalent Cations," *Biochemistry 14*(1):152-161, 1975.

Jeon et al., "Hydrogel-Encapsulated Lipid Membranes," *J. Am. Chem. Soc. 128*:42-43, 2006.

Karagiannis et al., "Water desalination cost literature: review and assessment," *Desalination 223*:448-456, 2008.

Kaufman et al., "Supported Lipid Bilayer Membranes for Water Purification by Reverse Osmosis," *Langmuir 26*(10):7388-7395, 2010.

Kozono et al., "Aquaporin water channels: atomic structure and molecular dynamics meet clinical medicine," *The Journal of Clinical Investigation 109*(11): 1395-1399, 2002.

Kumar et al., "Highly permeable polymeric membranes based on the incorporation of the functional water channel protein Aquaporin Z," *PNAS 104*(52):20719-20724, Dec. 26, 2007.

Li et al., "The role of membrane thickness in charged protein-lipid interactions," *Biochimica et Biophysica Acta 1818*:135-145, 2012.

Li et al., "Preparation of supported lipid membranes for aquaporin Z incorporation," *Colloids and Surfaces B: Biointerfaces 94*:333-340, 2012.

Martinetti et al., "High recovery of concentrated RO brines using forward osmosis and membrane distillation," *Journal of Membrane Science 331*:31-39, 2009.

Mathai et al., "Structural Determinants of Water Permeability through the Lipid Membrane," *J. Gen. Physiol. 131*(1):69-76, 2008.

McCutcheon et al., "A novel ammonia-carbon dioxide forward (direct) osmosis desalination process," *Desalination 174*:1-11, 2005.

Meinild et al., "Biodirectional Water Fluxes and Specificity for Small Hydrophilic Molecules in Aquaporins 0-5," *The Journal of Biological Chemistry 273*(49):32446-32451, 1998.

Mills et al., "Effects of cholesterol and unsaturated DOPC lipid on chain packing of saturated gel-phase DPPC bilayers," *Gen. Physiol. Biophys. 28*(2):126-139, 2009.

Milon et al., "Osmotic swelling of unilamellar vesicles by the stopped-flow light scattering method. Influence of vesicle size, solute, temperature, cholesterol and three a,ω-dihydroxycarotenoids," *Biochimica et Biophysica Acta 859*:1-9, 1986.

Nielsen, "Biomimetic membranes for sensor and separation applications," *Anal. Bioanal. Chem. 395*:697-718, 2009.

O'Connor et al., "Lipid Membranes with a Majority of Cholesterol: Applications to the Ocular Lens and Aquaporin 0," *The Journal of Physical Chemistry B 115*:6455-6464, 2011.

Petzold et al., "Interaction of cationic surfactant and anionic polyelectrolytes in mixed aqueous solutions," *Colloids and Surfaces A: Physicochem. Eng. Aspects 319*:43-50, 2008.

Portis et al., "Studies on the Mechanism of Membrane Fusion: Evidence for an Intermembrane $Ca^{2+}$-Phospholipid Complex, Synergism with $Mg^{2+}$, and Inhibition by Spectrin," *Biochemistry 18*(5):780-790, 1979.

Scheuring et al., "High resolution AFM topographs of the *Escherichia coli* water channel aquaporin Z," *The Embo Journal 18*(18):4981-4987, 1999.

Singh et al., "Cholesterol regulates prokaryotic Kir channel by direct binding to channel protein," *Biochimica et Biophysica Acta 1808*:2527-2533, 2011.

Wang et al., "The effect of charged lipids on bacteriorhodopsin membrane reconstitution and its photochemical activities," *Biochemical and Biophysical Research Communications 371*:814-817, 2008.

Wang et al., "Preparation and characterization of pore-suspending biomimetic membranes embedded with Aquaporin Z on carboxylated polyethylene glycol polymer cushion," *Soft Matter 7*:7274-7280, 2011.

Wong et al., "Single molecule measurements of channel proteins incorporated into biomimetic polymer membranes," *Nanotechnology 17*:3710-3717, 2006.

Woodle et al., "Liposome Preparation and Size Characterization," *Methods in Enzymology 171*:193-217, 1989.

Gonen et al., "The structure of aquaporins," *Quarterly Reviews of Biophysics* 39, 4:361-396, 2006.

Communication pursuant to Article 94(3) EPC, dated Jan. 13, 2017, for European Application No. 12 712 421.2-1370, 4 pages.

* cited by examiner

AQUAPORIN BASED THIN FILM COMPOSITE MEMBRANES

The present invention relates to thin film composite membranes wherein aquaporin water channels have been incorporated in the active layer. In addition the invention relates to a method of producing said thin film composite membrane and the use of it in filtration processes such as nanofiltration and osmotic filtration processes.

BACKGROUND

With the growing scarcity of freshwater and energy shortages worldwide, more and more interest is paid to the desalination of seawater and brackish water. A number of technologies are used, such as multi-effect distillation (MED), multistage flash (MSF) and vapor compression, and membrane desalination like reverse osmosis (RO) or nanofiltration (NF) [1].

Biological membranes showed most effective way for water transport characteristics across an osmotic pressure gradient via aquaporin (AQP) proteins [2], where the aquaporins were bound in phospholipid cellular membrane, water could pass through biological membranes freely but ions could not. It is estimated that a biomimetic membrane consisting of a lipid/AQP molar ratio of 2000:1 will have a water permeability of 960 L/m$^2$.h, which is much higher than those value of RO/FO membranes mentioned in the literatures [3]. Thus, the AQP based biomimetic membranes have great potential applications in the fields of water desalination, water reclamation, and waste water treatment, etc.

An artificial membrane may be developed to mimic the natural cellular membranes by incorporating AQPs into an ultrathin amphiphilic lipid film/amphiphilic block copolymer film, and/or incorporating AQPs into amphiphilic lipid/amphiphilic block copolymer vesicles, followed by incorporating vesicles containing AQPs into the selective layer onto a microporous substrate as support. U.S. Pat. No. 7,208,089 [4] "Biomimetic membranes" which described how the membrane proteins were incorporated into a membrane to enable water purification. The preferred form of the invention described a 5 nm thick monolayer of synthetic triblock copolymer and protein is deposited on the surface of a 25 mm commercial ultrafiltration disk using Langmuir-Blodgett trough, followed by cross-link the polymer using 254 nm UV light. Finally, the monolayer surface was covered by a porous PVDF membrane to ensure safe handling and prevent leakage at the edges. The device is assayed by fitting it in a chamber that forces pressurized water across the membrane. However, there has not been any data to support the membrane works well for the water desalination after embedded with membrane proteins. U.S. Pat. No. 7,857,978 [5] "Membrane for filtering of water", which described how the lipid bilayers incorporated with AQP and arranged in a sandwich structure for the water purification. However, there is still also no data to support the water desalination works with the AQP based lipid bilayer film in a sandwich structure.

Based on the available released reports and investigations, there is still not any open patents or literatures mentioning the water desalination membranes had been successfully fabricated in which the water channel molecules such as AQP was incorporated in the selective layer. On the other hand, it has been suggested that a water purification technology could be created by expressing the AQP protein into lipid layer vesicles and cast these membrane on porous support [5]. Some attempts fo fabricate biomimetic membranes with that concept have been published in the literature [3, 6,7]. Nielsen et al. proposed the design of biomimetic membranes for the design of biomimetic membrane for the water pufification or separation purposes, in which water channel protein were embedded in lipids or other amphiphilic matrix across a partition, encapsulation and cushion materials were used to support the membranes [6]. Based on the idea, some attempts to fabricate biomimetic membranes have been fulfilled and can be seen in the open literatures, where a planar lipid membrane of bilayer lipid membrane (BLM) were formed across one or more aperture of hydrophobic film suchas Teflon film and highly cross linked by hydrogel encapsulation to stabilize the ultimate membranes [11-13]. Besides that, Wong et al. [7] proposed a freestanding planar lipid membrane of bilayer lipid membrane (BLM) can be achieved by in situ encapsulation of lipid in (PMOXA-a-PDMS-b-PMOXA-a)-type tri-block copolymer membranes which were formed across an aperture in a Teflon partition. Wang et al. [3] proposed a pore-suspending biomimetic membrane via spreading aquaporin Z (AqpZ)-1,2-dimyristoyl-sn-glycero-3-phosphocholine (DMPC) (DMPC-AqpZ) vesicles on carboxylated polyethylene glycol polymer layer surface which anchored to the gold coated porous alumina, and they claimed that the water permeability of DMPC-AqpZ vesicles based biomimetic membrane were 3,000 time higher than those having only DMPC lipid vesicles incubated in the membranes based on stopped flow measurement. A major concern for the above designs is the lack of sufficient mechanical strength for membrane filtration, securing the stability of aquaporins, avoidance of membrane defects, and the scalability of the fabrication technology to make large areas of membranes. In addition, none of the above literature has demonstrated the applicability of the membranes for desalination purpose. Finally, the existing designs are generally only applicable for making small membrane areas (on the order of cm$^2$).

Reverse osmosis (RO) based desalination has experienced rapid growth over the last few decades. Current seawater RO membranes are generally thin film composite (TFC) type, where a polyamide rejection layer of ~200 nm is formed by interfacial polymerization of diamine and trimesoyl chloride monomers. Despite the significant improvements in membrane separation properties over the last 30 years, modern seawater RO membranes typically have relatively low water permeabilities of about (~0.8 Lm$^{-2}$ h$^{-1}$ bar$^{-1}$) (Tang, C. Y., Y.-N. Kwon, and J. O. Leckie, *Effect of membrane chemistry and coating layer on physiochemical properties of thin film composite polyamide RO and NF membranes II. Membrane physiochemical properties and their dependence on polyamide and coating layers. Desalination*, 2009. 242(1-3): p. 168-182). Meanwhile, several recent studies have been focusing on synthesizing high-permeability RO membranes, such as zeolite-based thin film nanocomposite membranes [Wang, H., B. A. Holmberg, and Y. Yan, *Homogeneous polymer—zeolite nanocomposite membranes by incorporating dispersible template-removed zeolite nanocrystals Journal of Materials Chemistry* 2002. 12: p. 4.].

However, high energy consumption due to restricted hydraulic permeability still remains a barrier to the use of TFC membranes for water filtration purposes including desalination, cf. Elimelech, et al. The Future of Seawater Desalination: Energy, Technology, and the Environment; Science 333, 712 (2011).

Thus, it is a purpose of the present invention to provide thin film composite membranes having improved water permeability, mechanical strength, and upscaling potential.

It is a further object of the invention to provide thin film composite membranes having reduced energy demand, thus making them useful for water desalination purposes. In addition, it is a purpose of the invention to provide filtration membranes wherein functional aquaporin water channels are incorporated in a thin film composite layer formed on a surface of a porous membrane substrate by an interfacial polymerization reaction.

BRIEF DESCRIPTION OF THE DRAWINGS

FIG. 6.).

SUMMARY OF THE INVENTION

Figure 1:
FIG. 1 shows the scanning electron micrographs(SEM) of the cross-sections of microporous substrates used for AQP based thin film composite membranes: (a) commercial UF membrane (MWCO, 50,000 Dalton) and (b) home-made UF membrane.

The present invention relates to aquaporin based thin film composite membranes and their preparation. The ultrathin selective layer was incorporated with amphiphilic lipid-AQP/amphiphilic copolymer-AQP vesicles and was supported by a microporous substrate. The resultant thin film composite membranes show high water flux which is even higher when lipid-AQP/copolymer-AQP vesicles are incorporated in the thin film compositeactive layer. Both membrane types keep a comparable and high rejection to solute ions. No other techniques known today can perform this purpose.ln a further embodiment of the invention the ultrathin selective layer is incorporated with amphiphilic lipid/amphiphilic copolymer vesicles without aquaporins.

Furthermore, the invention relates to a method of preparing a filtration membrane, where a thin film is created on a surface of a porous substrate by interfacial polymerization of an aqueous solution of an (aromatic) amine having an added suspension of amphiphilic lipid/copolymer vesicles followed by addition of an acid chloride solution in an organic solvent to allow the amine and the acyl chloride to form a polyamide active TFC layer wherein. During the formation of thin polyamide film, the vesicles, which may be in the form of liposomes or polymersomes with or without incorporated aquaporins (proteoliposomes or proteopolymersomes), become part of the active layer. Said aqueous amine solution comprising a suspension of liposomes or polymersomes with or without aquaporin water channels represents a novel intermediary product which is useful in the formation of the thin film composite membranes of the invention.

DETAILED DESCRIPTION OF THE INVENTION

Definitions

The abbreviation AQP is used herein to denote aquaporin water channels. AqpZ is used specifically for the E. coli aquaporin Z, e.g. in the examples. However, AqpZ is also used herein as a general example of aquaporin water channels. All known protein water channel molecules including aquaglyceroporins, naturally occurring or synthetically made, are useful in this invention.

The term "microporous" as used herein to characterize a feature of the support materials used in the preparation of the aquaporin thin film composite membranes cover a range of porosities from the nanoscale to the milliscale. Preferred porosities are typically in the micrometer scale.

Examples of amphiphilic lipids used herein are *E. coli* extract lipid (also known as *E. coli* mixed lipids), asolectin, DOPC and DPhPC all of which may be purchased from Avanti Polar Lipids, Alabaster, Alabama, USA.

Examples of amphiphilic copolymers used herein arethe A-B-A type with a preferred triblock copolymer example of PMOXA-a-PDMS-b-PMOXA-a, more specifically-PMOXA$_{15}$-PDMS$_{67}$-PMOXA$_{15}$, PMOXA$_{15}$-PDMS$_{110}$-PMOXA$_{15}$,PMOXA$_{15}$-PDMS$_{119}$-PMOXA$_{15}$, and PMOXA$_6$-PDMS$_{35}$-PMOXA$_6$such as can be purchased from Polymer Source, Canada; or the triblock copolymer can be a non-ionic detergent such as Synperonic PE/L64 (EO$_{10}$PO$_{30}$EO$_{10}$sold by FLUKA) and Pluronic PE 10300 (EO$_{12}$PO$_{56}$EO$_{12}$sold by BASF). In addition, triblock copolymers of the A-B-C type may be useful in the invention, such as described by Roxana Stoenescu et al. (2004) "Asymmetric ABC-Triblock Copolymer Membranes Induce a Directed Insertion of Membrane Proteins" Macromolecular Bioscience, p. 930-936,. In the triblock copolymers herein A and C are hydrophilic moieties, and B is a hydrophobic moiety. Diblock copolymers of the A-B type are also useful in certain embodiments of the invention, e.g. EO$_{61}$PO$_{95}$, EO$_{10}$Bd$_{12}$, EO$_{14}$Bd$_{35}$, EO$_{23}$Bd$_{46}$, EO$_{48}$DMS$_{70}$, and EO$_{15}$BO$_{16}$. Selection criteria for amphiphilic copolymer may depend on the specific type of aquaporin water channel protein to be incorporated. However, a few general criteria, such as a stable chemistry of the blocks, length of the hydrophobic segment being able to match the hydrophobic segment of the aquaporin protein either by "direct" match or by being able to fold into a match, i.a.having a maximum of approx. 140 repeat units in the B block of an A-B-A block copolymer and 100 for an A-B block copolymer. In addition, arelatively strong hydrophobicity is preferred in the hydrophobic region, and the Hydrophilic/Hydrophobic ratio should promote vesicle formation.EO=Ethylene Oxide, PMOXA=(poly) 2-Methyl Oxazoline, PO=Propylene Oxide, BO=Butylene Oxide, PDMS=(poly) Dimethyl Siloxane, and Bd=Butadiene.

The support membrane used herein is preferably a porous polysulfone or polyethersulfone sheet which can be prepared as disclosed herein or obtained from a vendor. It is possible to use other types of porous support material, and the skilled person in the art will know how to select a suitable support membrane.

The term "vesicle" as used herein denotes both liposomes and proteoliposomes as well is polymersomes (polymeric vesicles) and proteopolymersomes.

The terms "bivalent" and "divalent" are used herein interchangeably. By "osmotic filtration processes" is herein meant any type of reverse osmosis, forward osmosis and pressure retarded osmosis process as generally recognised in the art. More specifically, the osmotic processes of relevance herein all relate to separation processes where aqueous media are involved. The purpose of the osmotic separation process can be to extract water from an aqueous medium in order to obtain a more concentrated medium, or it can be to obtain purified water from sources such as waste water, brackish water or seawater. Finally, in pressure retarded osmosis, the purpose is to generate power from the extraction of pure water from a relatively less saline water source through a water selective and salt impermeable membrane into a more saline recipient.

Two types of vesicles were used to form AQP based thin film composite membranes: (1) amphiphilic lipid-AQP vesicles and (2) amphiphilic polymersome—AqpZ vesicles. Vesicles without AQP incorporation were also preparedfor comparison purpose. Furthermore, Vesicles with incorporation of an inactive AqpZ variant (AqpZ R189A) were also prepared for comparison purposes.

The first vesicle type is amphiphilic lipid-AQP vesicle that can be formed according to the following ways. Firstly, the purified AqpZ were reconstituted into proteoliposomes using various types of amphiphilic lipids including *E. coli* lipid extract, DPhPc (1,2-di-3,7,11,15-tetramethylhexadecanoyl)-sn-glycero-3-phosphocholine), DOPC (1,2-dioleoyl-sn-glycero-3-phosphocholine), and POPC (Palmitoyloleoyl phosphatidylcholine), etc. Then, the lipid was prepared to unilamellar and homogeneous preformed liposomes by extrusion through 0.4 pm pore size polycarbonate filters. The purified AqpZ was added to the liposome suspension and incubated at room temperature for 1 hour before loaded into dialysis tubings (molecular mass cut-off 12,000-14,000) and dialyzed against 100 volumes of 20 mM Phosphate buffer at pH 7.5 for 24-72 hours at room temperature. Finally, the liposome was extruded again through 0.2 pm pore size. The diameter of proteoliposomes obtained was measured by dynamic light scattering, and the results were shown in the Table 1.

The water permeability of lipid/polymeric vesicles with or without AqpZ measured by an applied photophysics stopped flow spectrometer, and the water permeability can be calculated by the following equation:

$$P_f = \frac{k}{\frac{S}{V_0}V_w\Delta_{osm}} \quad (1)$$

Where S is the initial surface area of the vesicles, $V_0$ is the initial volume of the vesicles, $V_w$ is the molar volume of water(18 cm$^3$/mol), and $\Delta_{osm}$ is the difference in osmolarity across the vesicle, i.e. the difference in osmolarity between the intravesicular and extravesicular aqueous solutions.

Some example of water permeability of lipid with or without AqpZ incorporated was illustrated in Table 1. The results demonstrated that AqpZ can be reconstituted well in DOPC.

TABLE 1

Water permeability (Pf) characterization of reconstituted AqpZ in different lipids

| | k value, s−1 | Vesiclediameter, nm | Pf, cm/s |
|---|---|---|---|
| DOPC Lipid only | 19.3 ± 0.2 | 157 | 0.00737 ± 0.000076 |
| DOPC Lipid-AqpZ (200:1) | 188 ± 20 | 116.7 | 0.057 ± 0.006 |

Figure 3:
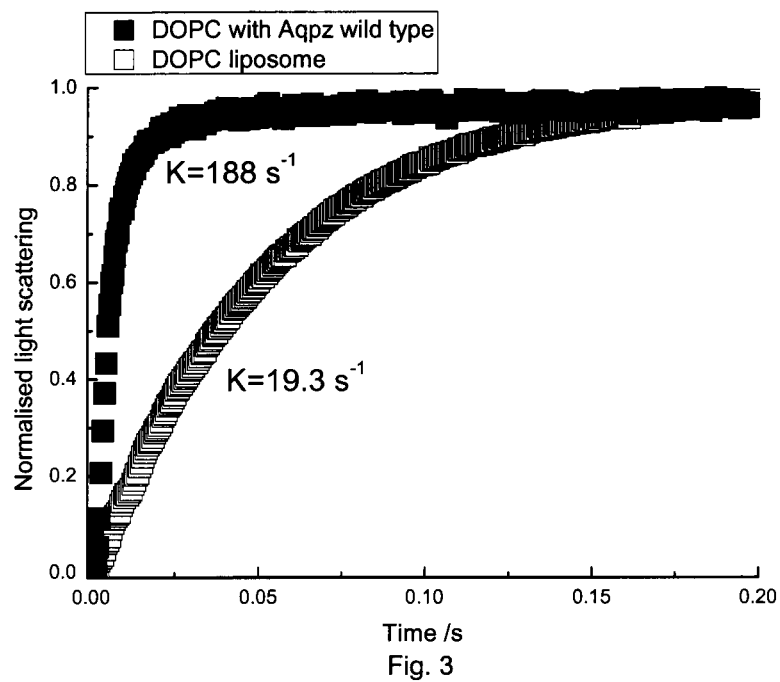
FIG. 3 shows the stopped flow measurement of DOPC lipid vesicles with or without AqpZ. The same data are given in FIG. 9.
Figure 4:
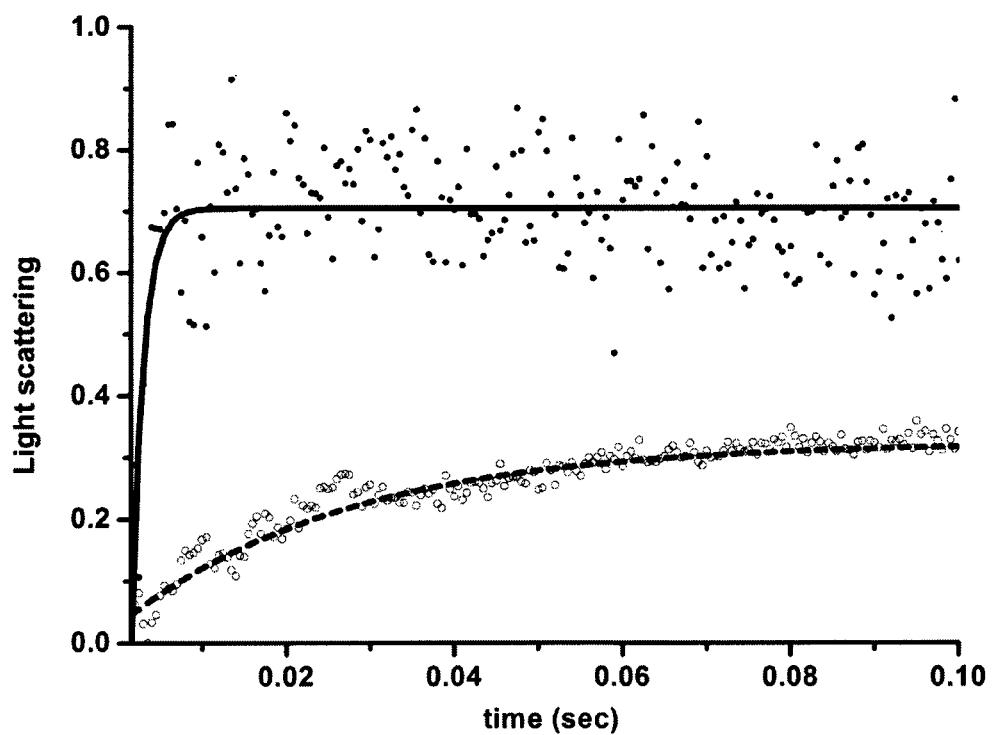
FIG. 4 shows normalized light scattering data from stopped flow measurement of $PMOXA_{15}$-$PDMS_{67}$-$PMOXA_{15}$(PMOXA-b-PDMS-b-PMOXA) polymer vesicles with or without AqpZ. Solid dots and line are polymersomes with AqpZ, k value 505 s-1, and hollow dots and dash line are polymersomes without AqpZ, k value 14 s-1.
Figure 9:
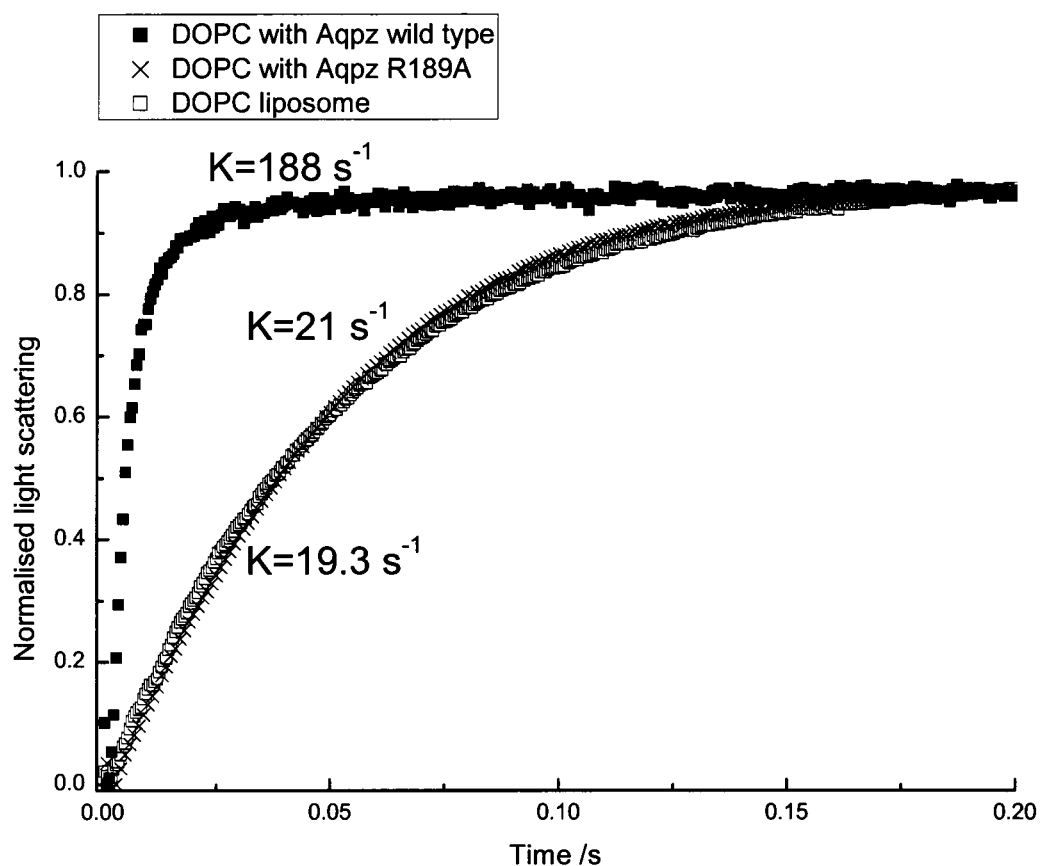
FIG. 9 shows normalized light scattering of different vesicles. Rate constant K value and water permeability of 3 different kinds vesicle, Aqpz wild type incorporated DOPC proteoliposome, Aqpz R189A incorporated DOPC proteoliposome (lipid to protein ratio 200:1) and DOPC liposome, were shown in the figure. Rate constants (k) were determined from average kinetic of 5-10 measurements by curve fitting of the plots to single order exponential. Water permeability was calculated based on Equation 1herein.

Rate constant (k) were determined from average kinetic of 5-10 measurements by curve fitting of the plots to double order exponential, cf. also similar data in FIG. 3 and FIG. 9 which features an additional curve resulting from DOPC vesicles incorporated with the aquaporin Z variant AqpZ R189A having negligible water transport resulting in a k value of 21 s-1 and a Pf value of 88 μm/s. The graph in FIG. 9 shows normalized light scattering as a function of time for different vesicles (liposomes and proteoliposomes). Rate constant k value and water permeability of 3 different kinds of vesicles: AqpZ wild type incorporated in DOPC proteoliposomes, AqpZ R189A incorporated in DOPC proteoliposomes (lipid to protein ratio for both types of proteoliposomes 200:1) and DOPC liposomes, are shown in the figure. Rate constants (k) were determined from average kinetic of 5-10 measurements by curve fitting of the plots to single order exponential. Water permeability was calculated based on equation (1). In addition, FIG. 4 shows the result of stopped flow experiments with polymersomes. The normalized light scattering curves fromPMOXA$_{15}$-PDMS$_{67}$-PMOXA$_{15}$(PMOXA-b-PDMS-b-PMOXA) polymer vesicles with and without AqpZ, where solid dots are data points for polymersomes with AqpZ, k value 505 s-1, and he hollow dots are data points for polymersomes without AqpZ, k value 14 s-1. The figure clearly shows that AqpZ incorporation in the polymersomes result in a much improved water permeability of the otherwise relatively water tight vesicles.

Figure 2:
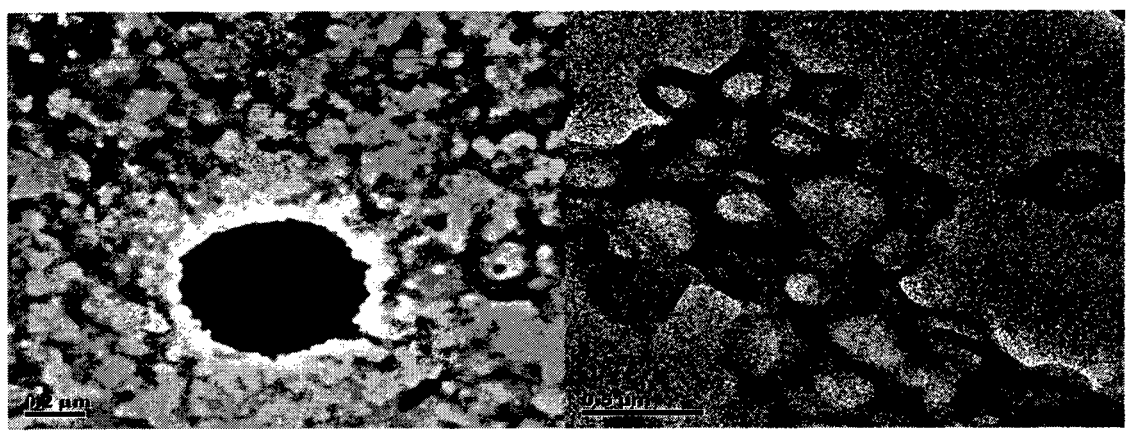
FIG. 2 shows the transmission electron micrographs (TEM) of $PMOXA_{15}$-$PDMS_{67}$-$PMOXA_{15}$vesicles.

The other vesicle type is polymersome—AqpZ vesicles which can be formed according to the following ways. (1) Preparation of polymeric vesicles of amphiphilic copolymer of PMOXA-a-PDMS-b-PMOXA-a, where a may vary between about 10 and about 20, and b may vary between about 100 and about 120(preferably PMOXA$_{15}$-PDMS$_{67}$-PMOXA$_{15}$)the copolymer was dissolved in chloroform with rigorous agitation and left still at room temperature to the homogeneous mixing together, of which the concentration in the solution was from 1.0 to 20.0 w/v. % (8~12 w/v.%). Then, the chloroform was evaporated under nitrogen purge in a rotary vapor evaporator. The copolymer was further dried in a vacuum oven at 0.3 mbar at room temperature overnight to remove the trace amount of remaining solvent. After that, 1 ml of PBS solution was added to the dried block copolymer and the mixture was again subject to rigorous agitation for a pre-determined duration. The diameter of polymersome vesicle obtained was shown by TEM image (FIG. 2), and the diameter of the polymersome vesicle varied from 200 nm to 350 nm (the left part shows staining of a polymersome and right partshows aggregation of polymersomes). (2) Preparation of polymersome-AqpZ vesicles, the process of preparation of polymersome-AqpZ vesicles are the same as lipid vesicles but change the lipid to AqpZ ratio from 200:1 (molar ratio) to 20:1-500:1 (preferred 50:1 to 200:1, molar ratio).

Figure 6:
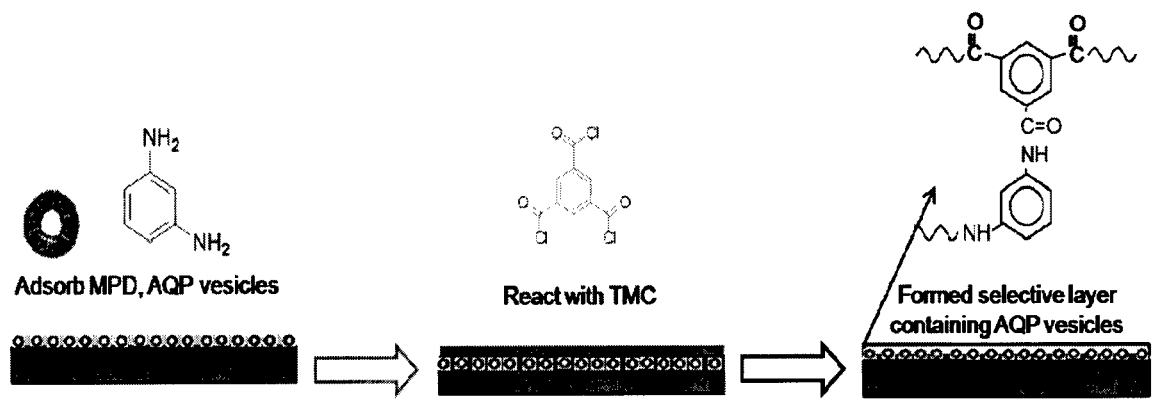
FIG. 6 shows the schematics of interfacial polymerization process to form AQP based thin film desalination membrane.

The process and chemical reaction usedfor preparing AQP based thin film composite membrane is described in FIG. 6. Here, a commercial microporous UF membrane used as support was firstly heated in 60~90 (70~80)° C. Milli-Q water for 1~5 (1-2 min) minutes and cooled in room temperature Milli-Q water for stable pore structure. The substrate was then removed, the water on surface removed with compressed air and the surface side was covered byan aqueous amine solution containing vesicles with or without AqpZ for 2~20 min (5~10 min), of which, the concentration of vesicles in the amine solution was varied from 0.02~0.5 mg/ml (preferred 0.05~0.2 mg/ml). After that, the solution was removed from the surface. One way of doing this was to leave the substrate vertically standing in the air for 5-30 min (preferred 5-15 min), followed by blowing the surface to remove any possible aggregated vesicles onto the surface with compressed nitrogen gas with at 0.5~3 bar (preferred 1~2 bar) for 1~2 min, then the substrate continued vertically standing dry for another 10~40 min (preferred 15~25 min) for the any possible excess solution completely away from the surface. Subsequently, an acyl chloride organic solution was poured onto the surface of the saturated substrate and reacted for 0.5~10 min (1~2 min), then it was formed an ultrathin polyamide selective layer incorporated vesicles with/without AqpZ over the surface of substrate. The nascent composite membrane was rinsed to completely remove residual reactants and stored in Milli-Q water, and stored in Milli-Q water till to use.An aromatic amine having two amine functionalities, such as meta-phenylene diamine (MPD) is useful or preferred in the process. However, the skilled person in the art of preparing interfacially polymerised thin film active layers will be able to select other useful amine compounds. Likewise, the acyl chloride used herein is preferably trimesoyl chloride (TMC) having three acyl chloride groups thus providing very good cross linking with MPD resulting in an aromatic polyamide layer (AP layer). Thus, an aspect of the invention relates to an aqueous amine solution containing vesicles with or without AqpZ or other aquaporin water channel, where said amine is preferably an aromatic amine having two or more amine functionalities, such as meta-phenylene diamine, and said vesicles may be of amphiphilic block copolymer or of amphiphilic lipid optionally having an additional admixture of cholesterol, such as between about 20 to 40 molar % in the case where the lipid vesicles further contain aquaporin. Said amine solution containing vesicles is a novel intermediary product useful in the preparation of the thin film composite membranes of the invention.

The amine solution was prepared by dissolving monomer of m-Phenylenediamine (MPD) and vesicles (suspended) with/without AqpZ in Milli-Q water. Concentrations of monomer and optional additives were from 0.5 to 4.0 wt. % (1.0~2.0%). The acid chloride solution was prepared by dissolving monomers of trimesoyl chloride (TMC) in organic solvent such as hexane, (n-hexane) or cyclohexane with or without optional additives.Additives were selected from E-caprolactam, N,N-dibutylformamide, bis(pentamethylene) urea, caprylic acid ethyl ester, Sodium dodecylsulphonate, and combination thereof. The concentration of acid chloride monomer used was from 0.05 to 2 (0.1~0.5%) wt./v %. The reaction is illustrated in the scheme shown as FIG. 6.

Figure 7:
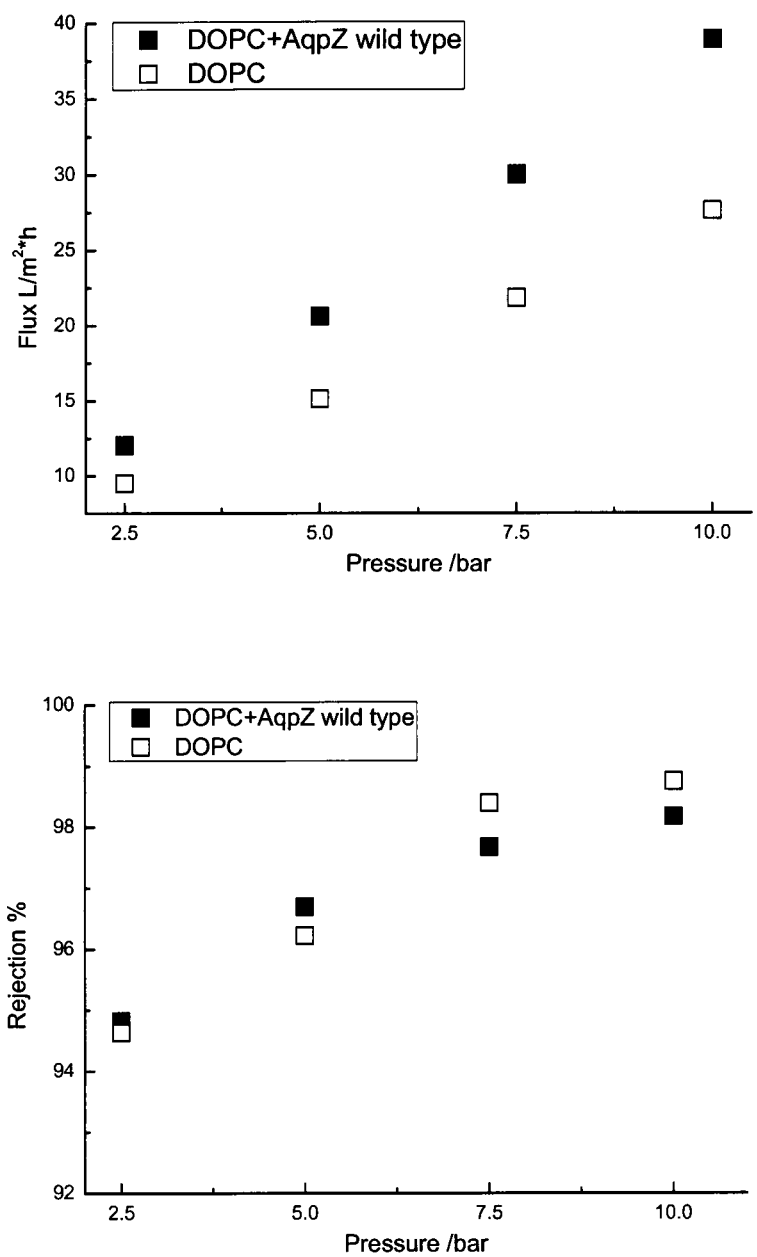
FIG. 7 shows the comparison of the water flux and solute rejection for TFC membrane incorporated with lipid vesicles with/without AQPs. DOPC: 0.08 mg/ml DOPC vesicles in amine solution (1.5 wt. % MPD, 98.5 wt. % $H_2O$); AQP: 0.08 mg/ml DOPC incorporated AqpZ (DOPC:AqpZ, 200:1, molar ratio) vesicles in amine solution (1.5 wt. % MPD, 98.5 wt. % $H_2O$). Test condition: 500 ppm NaCl, 3 hr compaction before collection.
Figure 8:
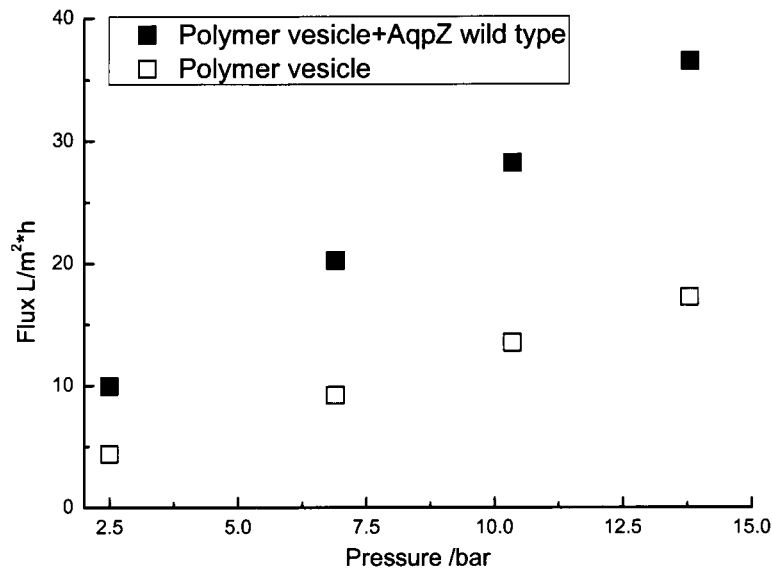
FIG. 8 shows the comparison of the water flux and solute rejection for TFC membrane incorporated with polymeric vesicles with/without AQPs. P-vesicle: 0.08 mg/ml polymersome ($PMOXA_{15}$-$PDMS_{67}$-$PMOXA_{15}$) vesicles in amine solution (1.5 wt. % MPD, 98.5 wt. % $H_2O$); AQP: 0.08 mg/ml DOPC incorporated AqpZ (DOPC:AqpZ, 50:1, molar ratio) vesicles in amine solution (1.5 wt. % MPD, 98.5 wt. % $H_2O$). Test condition: 500 ppm NaCl, 3 hr compaction before collection.
Figure 8:
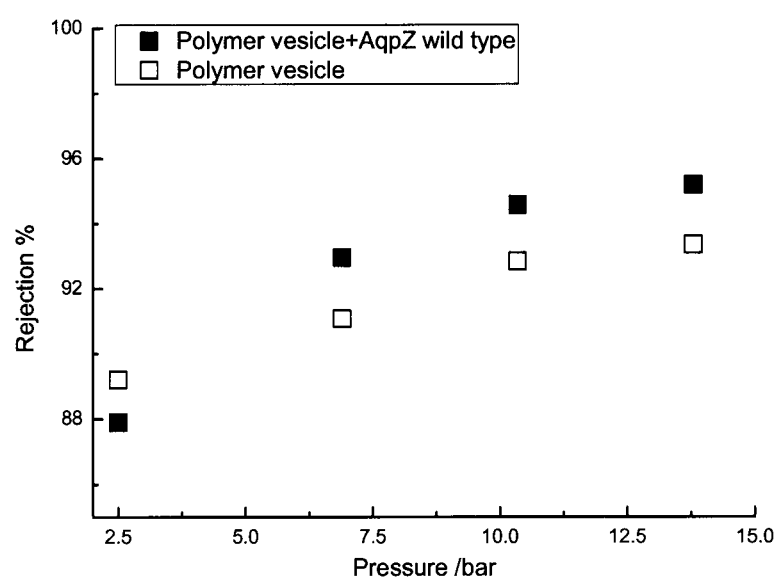
Figure 10:
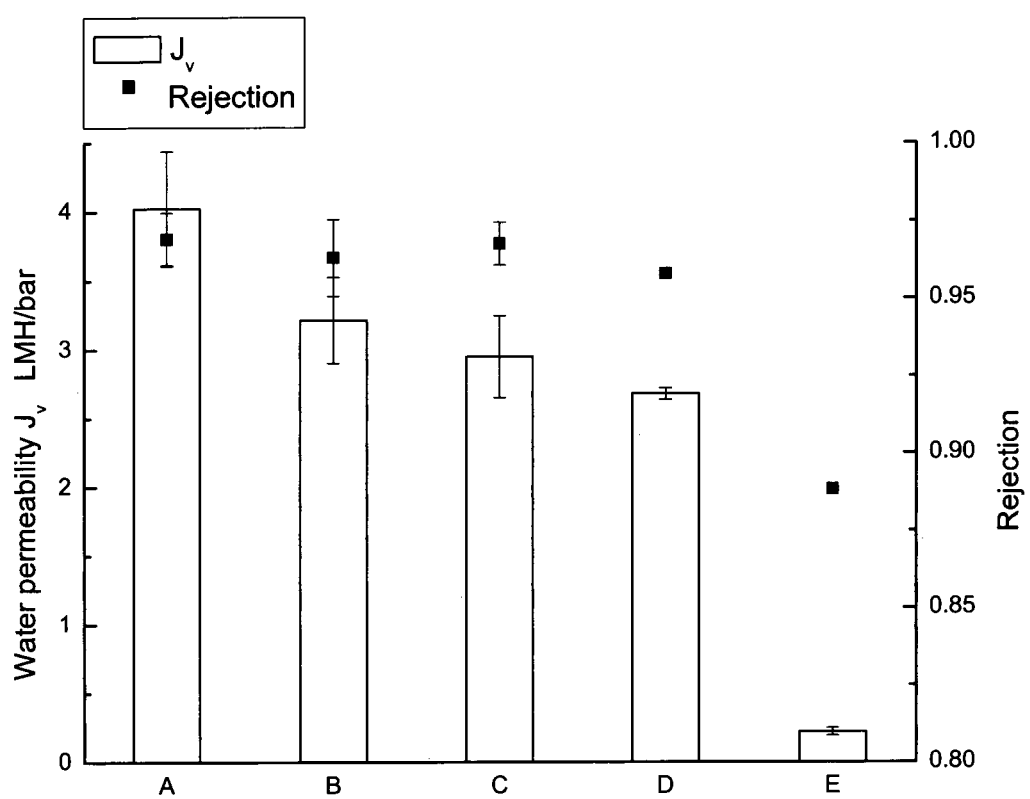
FIG. 10 is a bar diagram showingRO test performance of different membranes, where the testing conditions were 5 bar, 10 mM NaCl.

In our RO experiments the water flux of the thin film composite membranes having incorporated amphiphilic lipid/polymeric vesicles without AqpZ is relatively high and increasing with increasing applied pressure. The same pattern is seen for TFC membranes containing amphiphilic lipid/polymeric-AqpZ vesicles, where an even higher water flux is obtained than for those membranes having only amphiphilic lipid/polymeric vesicles without AqpZ incorporated, but both types of membranes keep the comparable rejection to the solute, such as sodium chloride, cf. FIGS. 7 and 8. Further data are given in FIGS. 10 and 11 to show that a TFC membrane prepared according to the invention but having incorporated DOPC vesicles with an inactive aquaporin Z does not exhibit an improved water flux although the salt rejection is maintained. FIG. 10 is a bar diagram showing RO test performance of different membranes prepared according to the examples herein in comparison with two commercial membranes (BW30 and SW3OHR), where the testing conditions were 5 bar, 10 mM NaCl. In the figureA represents PSUF200+DOPC+Aqpz wild type, B represents PSUF200, C represents PSUF200+DOPC+Aqpz R189A, D represents BW30, and E represents SW3OHR. PSUF200+DOPC+Aqpz wild type was the membrane with active Aqpz incorporated DOPC proteoliposome involved polyamide layer. PSUF200 was the hand cast polysulfone membrane (200 μm) with normal polyamide layer. PSUF200+DOPC+Aqpz R189A was the membrane with inactive Aqpz incorporated DOPC proteoliposome involved polyamide layer. The figure clearly shows that the TFC membranes of the invention with and without incorporated aquaporin water channels exhibit a higher water flux (LMH/bar) and NaCl rejection compared to a commercial RO sea water desalination membrane (SW3OHR). In addition, the figure shows that a TFC membrane of the invention with wild type aquaporinZ has a significantly higher water flux (LMH/bar) compared to the commercial RO brackish water desalination membrane (BW30).

Figure 11:
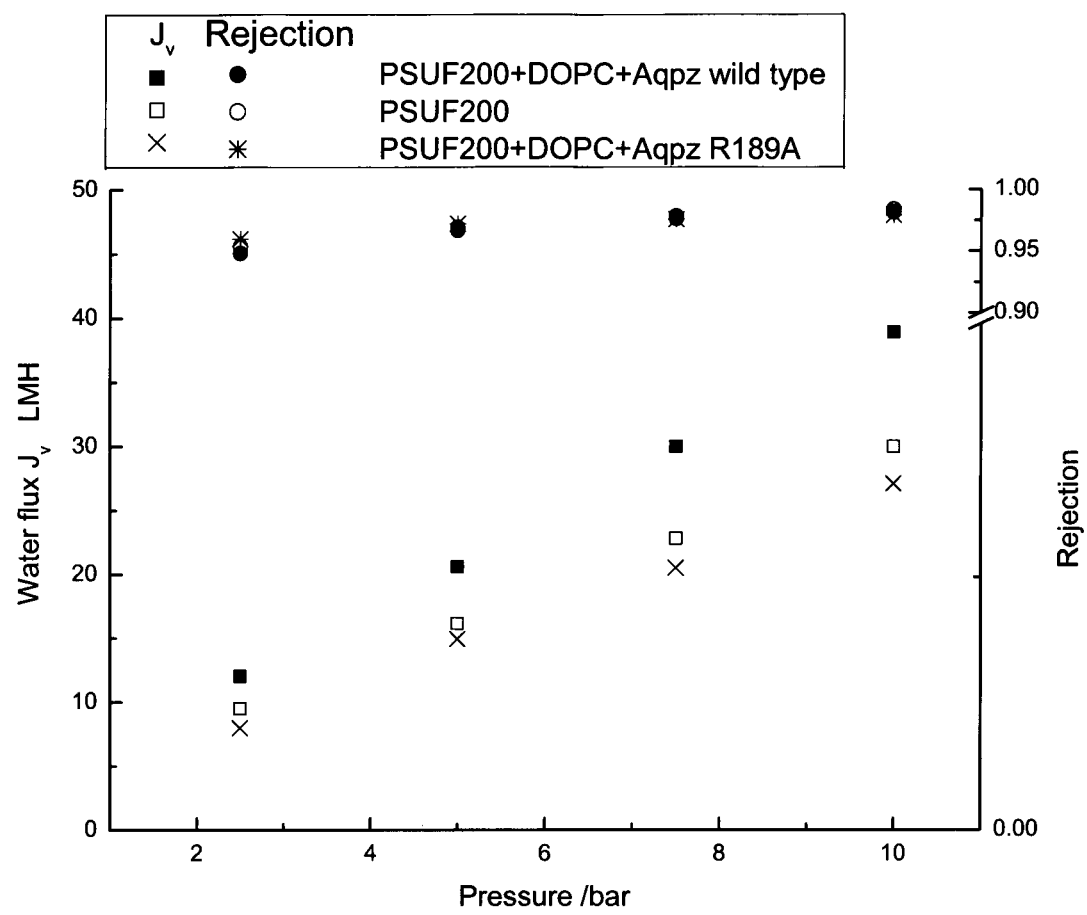
FIG. 11 is a graph showing water flux and NaCl rejection change with pressure increasing from 2.5 to 10 bar. PSUF200+DOPC+Aqpz wild type was the membrane with active Aqpz incorporated DOPC proteoliposome involved polyamide layer. PSUF200 was the membrane with normal polyamide layer. PSUF200+DOPC+Aqpz R189Awas the membrane with inactive Aqpz incorporated DOPC proteoliposome involved polyamide layer (an experiment description is necessary for FIGS. 10 and 11, cf.
Figure 12:
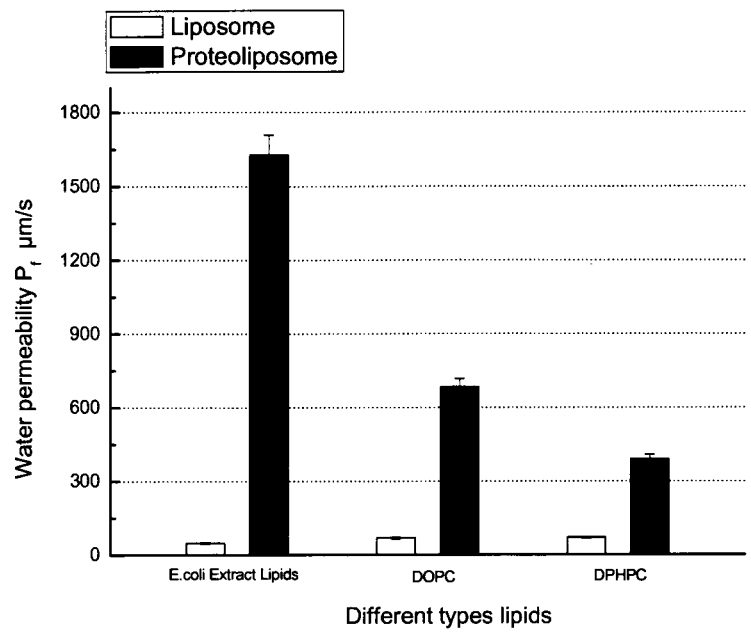
FIG. 12 is a bar diagram showing water permeabilities of various liposomes and corresponding proteoliposomes.

FIG. 11 is a graph showing water flux and NaCl rejection change with pressure increasing from 2.5 to 10 bar. PSUF200+DOPC+Aqpz wild type was the membrane with active Aqpz incorporated DOPC proteoliposome involved polyamide layer. PSUF200 was the membrane with normal polyamide layer. PSUF200+DOPC+Aqpz R189A was the membrane with inactive Aqpz incorporated DOPC proteoliposome involved polyamide layer.

Furthermore, the flux of polymersome-AqpZ vesicle (50:1 molar ratio) incorporated composite membrane show 2 times flux higher than those membrane where only polymersomes has been incorporated in the composite membrane. And the AqpZ based desalination membranes can sustain pressure higher than 200 psi. Based on these performance data, we can draw a conclusion that aquaporin based thin film composite membrane disclosed in this invention are promising in the water desalination, water reclamation, and waste water treatment, etc.

Modifications Covered by the Invention

The following methods will be investigated in the future to further improve the membrane performance:
1. Spinning coating method, such as depositing lipid/polymeric vesicles (with or without AqpZ) onto the membrane substrate surface by spinning coating method after membrane substrate has been soaked with the amine solution.
2. Membrane surface coating. A coating layer can be applied after the interfacial polymerization to protect the lipid/polymeric vesicles with AqpZ when facing polluted water sources using cross linked hydrogels like PVA, PVP, etc. and their derivatives.
3. The AQP based thin film composite membrane can also be applied in forward osmosis and pressure retarded osmosis applications when using thin and more porous microporous substrate as substrate.
4. Other types of aquaporins, lipids, and polymeric vesicles combinations can be explored and are covered by the invention.
5. Other types of natural or synthetic water channels or ion channels may be incorporated.

Novel Features

As we know, the biological membrane showed a most effective way for water transport characteristics across an osmotic pressure gradient via aquaporin proteins [2]. Several efforts have been made for the artificial membrane to mimic the natural cellular membranes by incorporating AQPs into an ultrathin amphiphilic lipid film/amphiphilic block copolymer film and membranes. For example, U.S. Pat. No. 7,208,089 [4] "Biomimetic Membranes" have described how membrane proteins were incorporated into a membrane to enable water purification. However, there is no data to show that these membranes can work for desalination. The mechanical strength of membrane is a major issue. U.S. Pat.No. 7,857,987 [5] "Membrane for Filtering of Water" described how the lipid bilayers incorporated with AQP are arranged in a sandwich structure for water purification. However, there is also no data to support the water desalination works with the AQP based lipid bilayer film in sandwich structures.

Till to the present, there is still not any open patents or literature that mention the water desalination membranes had been successfully fabricated in which the water channel molecules such as AQP were incorporated in the functional layer. This invention developed aquaporin based thin film composite desalination membrane comprising an ultrathin selective layer incorporated with AQP-lipid/AQP-polymer vesicles which were supported by a microporous membrane substrate.

One of the embodiments was using lipid vesicles with/without AQPZ incorporated into the thin film rejection layer and another embodiment was using polymeric vesicles with/without AqpZ incorporated into the thin film rejection layer. All the AqpZ based thin film composite membranes show higher water flux than those membranes that only had lipid/polymeric vesicles incorporated. In addition, the membrane developed in this disclosure was able to withstand high pressure (\ 200 psi). The fabrication technique can be easily scaled up. This will enable the AQP based thin film composite membrane disclosed in this invention invery promising embodiments for water desalination, water reclamation, and wast water treatment etc.

Utility

In this invention, Aquaporin based thin film composite membranes were developed, where the ultrathin selective layer was incorporated with amphiphilic lipid-AQP/amphiphilic copolymer-AQP vesicles supported by a microporous substrate. An ultrafiltration membrane was used as a support substrate, and a thin selective layer containing said amphiphilic vesicles was formed via interfacial polymerization on top of the substrate.The AQP based thin film composite membranes in this invention are made by incorporated vesicles containing water channels such as AqpZ into the thin selective layer. In this method, the vesicles were totally fixed into the selective layer, which reduces the risk of instability of vesicles/aquaporin during long term operation when when using the other method like vesicles fusion [14] or Langmiur-Blodgett trough methods [4] which many mentioned in the open literatures. The adoption of the thin film composite layer as the matrix for housing AQP containing vesicles also ensures the mechanical stability of the resultant membranes.In term of structure, the lipid/polymeric vesicles with or without AqpZ in the vesicles which are incorporated in the thin selective layer, and the AQP based membrane of the invention can achieve even higher water flux and comparable rejection to salts compared to those having only lipid/polymeric vesicles into the selective layer. This method open a new dimension to incorporation of various vesicles containing natural and/or synthetic water channels as well as ion channels into selective layer via interfacial polymerization, and resulted in higher water permeability membranes.

The membrane mentioned in this invention can be applied and is promising in many applications including reverse (RO) or forward osmosis (FO) for seawater and brackish water desalination, water reclamation, ultrapure water production, water softening,drinking water production, water purification, waste water treatment [15], seawater and brine desalination [16, 17], food processing [18, 29], etc. and it can be used for reverse osmosis, nanofiltration, forward osmosis, and pressure retarded osmosis applications.

EXAMPLE 1

Preparation of Liposomes and Proteoliposomes

Materials and Methods used in the Preparation

Unless mentioned otherwise, ultrapure water from a Milli-Q ultrapure water system (Milli-pore Singapore Pte Ltd) with a resistivity of 18.2 MΩcm was used for preparing reagents in this study. Analytical grade NaCl, KCl, Na2HPO4, KH2PO4, MgCl2, MgSO4 and Na2SO4 with purity over 99% were purchased from Merck (Germany). Sucrose (ultrapure grade) was obtained from USB Corporation (Cleveland, USA). Chemicals used in AquaporinZ expression and purification, including Ampicilin, Chloramphenicol, IPTG, Tris, β-mercaptoethanol, glycerol and lysozyme, were obtained from Sigma-Aldrich and were either ACS (American Chemical Society) grade or SigmaUltra grade. Benzonase was purchased from Merck. Ni-NTA resin was purchased from Bio-Rad.n-Octyl-b-D-glucopyranoside (OG, ultrapure grade, Merck, Germany) was used as detergent during proteoliposome preparation. Lipids used in the current study include 1,2-dioleoyl-sn-glycero-3-phosphocholine (DOPC), E. coli Extract Lipid, 1,2-diphytanoyl-sn-glycero-3-phosphocholine (DPHPC), 1,2-dioleoyl-sn-glycero-3-phospho-(1'-rac-glycerol) (sodium salt) (DOPG) and 1,2-dioleoyl-3-trimethylammonium-propane (chloride salt) (DOTAP). These lipids were provided in chloroform solutions (20 mg lipid/mi) by Avanti Polar Lipids (Alabama, USA). Lipids were kept in −20° C. fridge till use. All chemicals were used without further purification. In some experiments, cholesterol (Avanti Polar Lipids) was used as an additive for proteoliposome preparation.

AquaporinZ (AqpZ) Expression and Purification

AqpZ, an aquaporin found in E. coli cell membrane, was chosen in this study due to its availability and its well characterized properties [25]. Expression and purification of AqpZ was performed according to previously reported protocol [25, 27]. The pET3a plasmid containing the AqpZ gene was transformed into an E. coli Competent cell strain C41-pLysS for protein over-expression. Cells from a single colony was picked to inoculate in Terrific Broth (TB) media with 100 μg/ml ampicillin and 34 μg/ml chloramphenicol, and grown overnight at 37° C. Overnight cultures were diluted 100-fold into fresh TB broth and propagated to a density of about 1.2-1.5 (OD at 600 nm). The cells were induced with 1 mM isopropyl-β-thiogalactoside (IPTG) and grown at 37° C. for 3 hours before centrifugation. AqpZ was purified by using ion-exchange chromatography followed by Ni-NTA affinity chromatography. The harvested cell was resuspended in anion exchange binding buffer (20 mM Tris pH 8.0, 50 mM NaCl, 2 mM β-mercaptoethanol, 10% glycerol) in the presence of 0.4 mg/ml lysozyme, 50 units Bensonase (Merck) and 3% n-octyl β-D-Glucopyranoside. The sample was subjected to five times lysis cycles in a microfluidizer followed by centrifugation to remove the insoluble materials. The supernatant was passed through a Q-sepharose fast flow column (Amersham Pharmacia), and the flow through was collected. The flow though fraction was topped up with 250 mM NaCl before loaded onto a pre-equilibrated Ni-NTA column (Bio-Rad). The protein was allowed to bind to the resin with gentle shaking at 4° C., overnight. The nickel resin with bound fusion protein was washed with 20 column volumes of buffer containing 20 mM Tris pH 8.0, 300 mM NaCl, 25 mM Imidazole, 2 mM β-mercaptoethanol, 10% glycerol). The bound proteins were eluted with elution buffer containing (20 mM Tris pH 8.0, 300 mM NaCl, 300 mM Imidazole, 2 mM β-mercaptoethanol, 10% glycerol, containing 30 mM n-octyl β-D-Glucopyranoside). The fractions containing the fusion protein were checked by gel electrophoresis and concentrated to the concentration of 5-10 mg/ml with Amicon concentrator, membrane cut off 10,000 Da (Milipore®). Protein concentration of AqpZ was determined measuring UV absorbance at 280 nm (AqpZ extinction coefficient=35090 M-1cm-1, molecular weight=24524 g/mol. The concentrated AqpZ was kept frozen at −80° C. till use.

AqpZ Expression Constructs

Genomic DNA from E. coli DH5a was used as a source for amplifying the AqpZ gene. The AqpZ gene was amplified using gene specific primers with the addition 6-His tag sequence at the N-terminus. The amplified AqpZ was digested with the enzyme NdeI and BamHI and then ligated to the similarly digested pEt3a vector DNA. The positive clones were verified by PCR-screening. Then the authenticity of the constructs was confirmed by DNA sequencing (1st-base).

To obtain the AqpZ mutant R189A, arginine residue at position 189 was replaced with Alanine to the pET3a/AqpZ by using the Quikchange™ site-directed mutagenesis (SDM) kit (Stratagene, La Jolla, CA). The mutagenesis constructs was confirmed by DNA sequencing (1st-base)

Over-Expression of AqpZ.

The pET3a plasmid containing the AqpZ gene (wild type and R189A) was transformed into an E. coli Competent cell strain C41-pLysS for protein over-expression. Cells from a single colony was picked to inoculate in Terrific Broth (TB) media with 100 μg/ml ampicillin and 34 μg/ml chloramphenicol, and grown overnight at 37° C. Overnight cultures were diluted 100-fold into fresh TB broth and propagated to a density of about 1.2-1.5 (OD at 600 nm). The cells were induced with 1 mM isopropyl-β-thiogalactoside (IPTG) and grown at 37° C. for 3 hours before centrifugation. AqpZ was purified by using ion-exchange chromatography followed by Ni-NTA affinity chromatography. The harvested cell was resuspended in anion exchange binding buffer (20 mM Tris pH 8.0, 50 mM NaCl, 2 mM β-mercaptoethanol, 10% glycerol) in the presence of 0.4 mg/ml lysozyme, 50 units Bensonase (Merck) and 3% n-octyl β-D-Glucopyranoside. The sample was subjected to five times lysis cycles in a microfluidizer followed by centrifugation to remove the insoluble materials. The supernatant was passed through a Q-sepharose fast flow column (Amersham Pharmacia), and the flow through was collected. The flow though fraction was topped up with 250 mM NaCl before loaded onto a pre-equilibrated Ni-NTA column (Bio-Rad). The protein was allowed to bind to the resin with gentle shaking at 4° C., overnight. The nickel resin with bound fusion protein was washed with 20 column volumes of buffer containing 20 mM Tris pH 8.0, 300 mM NaCl, 25 mM Imidazole, 2 mM β-mercaptoethanol, 10% glycerol). The bound proteins were eluted with elution buffer containing (20 mM Tris pH 8.0, 300 mM NaCl, 300 mM Imidazole, 2 mM β-mercaptoethanol, 10% glycerol, containing 30 mM n-octyl β-D-Glucopyranoside). The fractions containing the fusion protein were checked by gel electrophoresis and concentrated to the concentration of 5-10 mg/ml with Amicon concentrator, membrane cut off 10,000 Da (Milipore®). Protein concentration of AqpZ (wild type and R189A) was determined measuring UV absorbance at 280 nm (AqpZ extinction coefficient=35090 M-1 cm-1, molecular weight=24524 g/mol. The concentrated AqpZ was kept frozen at -80° C. till use.

Liposome and Proteoliposome Preparation

Lipid vesicles were prepared by the film rehydration method [26, 27]. A 10 mg lipid dissolved in 0.5 ml chloroform was dried under nitrogen gas to form a thin lipid film. In some experiments, a predetermined amount of cholesterol was mixed with a given lipid (DOPC in this study) to form a cholesterol containing lipid film. In either case, the resulting film was kept in a vacuum desiccator for at least 2 hours. A 1 ml phosphate buffered saline (PBS) buffer solution (pH 7.4) was used to rehydrate the lipid film, followed by 3 cycles of freeze thaw treatment. The resulting solution contained unilamellar lipid vesicles with wide size distribution. Liposomes with uniform size were obtained by extruding the solution through a 200 nm pore size polycarbonate filter for 21 times using an Avestin extruder (Canada). Proteoliposomes were prepared by incorporating AqpZ into liposome by the dialysis method [20]. Briefly, an AqpZ solution was mixed with a second solution containing 10 mg/ml lipid vesicle and 1% detergent OG at a desired protein lipid ratio, followed by incubating at room temperature for 1 hr. Dialysis tubing (Spectrum laboratories, USA, with MWCO 12~14 KDa) was used to remove OG from the proteoliposome solution by dialyzing it against a PBS buffer solution at pH 7.4 for 3 days. During this period, the dialysis PBS buffer solution was changed once every day. After the 3-day dialysis, AqpZ (wild type or R189A) was successfully reconstituted into lipid vesicles.

Liposome and Proteoliposome Characterization

Size and Zeta Potential Characterization

The size of liposome and proteoliposome was determined using Zetasizer Nano ZS (Malvern Instruments Limited, UK). The measured diameter was used for water permeability calculation of liposome or proteoliposome. In addition, the size determination was also used to monitor vesicle solution quality. In this study, the solution PolyDispersity Index (PDI) was consistently smaller than 0.2, indicating a narrow size distribution of the vesicles [29]. A uniform size distribution helps to minimize errors in water permeability determination of vesicles. Zeta potential values of liposomes and proteoliposomes were also measured by Zetasizer Nano ZS.

Water Permeability and Solute reflection Coefficient Evaluation

SX20 Stopped-Flow Spectrometer (Applied Photophysics, United Kingdom) was used to characterize vesicles water permeability. Osmolarity of all solution used in stopped flow test was characterized by a Vapor Osmometer 5520 (Wescor, Inc, USA). Fluorescence kinetic mode was chosen for all stopped flow tests, with a light source of 500 nm wave length. Rapidly mixing of sample solution and draw solution was driven by 8 atm pressurized nitrogen gas with a dead time of 500 ps. In all the stopped flow measurements, the temperature was maintained at 23±1° C. Vesicle volume change rate was recorded as a function of time, based on the relationship between fluorescence signal and vesicle volume. Vesicle volume reduction was due to water transport outwards, which will be affected by osmolarity difference across the vesicle as well as the water permeability of the vesicle. In a typical stopped flow experiment, both the draw solution and the sample solution had identical PBS buffer concentration, such that the water permeation was induced by the draw solute (e.g., sucrose or NaCl) concentration. The water permeability can be calculated by Equation 1 above.

The reflection coefficient a of a given solute can be determined by comparing the measured water permeability using the particular draw solute (Pf,solute) to that for a reference solute (Pf,reference) with same osmolarity condition. Sucrose was used as the reference solute in the current study, since it is a relatively large molecule with nearly complete retention by lipid vesicles. Thus, the apparent reflection coefficient of smaller draw solutes such as NaCl can calculated by [30]:

$$\sigma = \frac{P_{f,solute}}{P_{f,reference}} \qquad \text{Equation 2}$$

In addition to sucrose and NaCl, other species can also be applied as draw solute. $MgCl_2$ dissolved in PBS buffer solutions were used to evaluate bivalent ions' effect in affecting liposome and proteoliposome properties. Vesicles were in PBS buffer solution. Draw solutions, with 914 mosm/l osmolarity, were different concentration $MgCl_2$ dissolved PBS buffer solutions. Additional sucrose was applied to maintain 914 mosm/I osmolarity of all draw solutions.

Using sucrose as a draw solute (Δosm=356 mosm/L), the kinetic rate constant for the DOPC liposome was ~20 L/s. In comparison, a much improved rate constant (188 L/s) was observed for the reconstituted DOPC AqpZ proteoliposome (at a protein-to-lipid ratio of 1:200, cf. Table 1 above). The corresponding water permeability of the proteoliposome was 690 μm/s. Assuming all the AqpZ were successfully incorporated into liposomes, the resulting proteoliposomes have protein to lipid ratio of 1:200. It is possible to estimate the amount of AqpZ monomer by referring to the area of per AqpZ and per lipid [31, 32]. Therefore, permeability of each AqpZ can be estimated as $3.2 \times 10^{-14}$ cm$^3$/s. This value agrees with the previous result reported by Norman T. Hovijitra (~$4 \times 10^{-14}$ cm$^3$/s) [33]. Thus, the proteoliposome permeability was an order of magnitude higher than the corresponding DOPC liposome. Similar trend was also observed when NaCl was used as a draw solution, confirming the excellent water permeability of AqpZ.

The reflection coefficient of NaCl (determined by Equation 2 using sucrose as a reference solute) by DOPC based liposomes and proteoliposomes were both close to unity. In the current study, although the water permeability was significantly enhanced after the AqpZ incorporation, the retention of NaCl remained excellent. This suggests that both the lipid bilayer and AqpZ had good retention against the solute making them good candidates for incorporation in the TFC membranes of the invention.

Various Lipid Effect

Various lipids were used to prepare unilamellar vesicles in PBS buffer solutions. AqpZ proteoliposomes reconstitution were performed at fixed protein to lipid mole ratio (1:200), following same procedure. It turned out different water permeabilities among different proteoliposomes shown in FIG. 13. *E. coli* Extract lipid, DOPC and DPHPC lipid were favorable for the Aqpz with *E. coli* Extract lipid being the more favorable. Because the permeability of prteoliposome is dominated by the activity and quantity of AqpZ tetramer, in which the permeability activity of AqpZ remain same among different proteoliposome [33]. Therefore, we think that different lipid properties, such as structure and head group may influence the reconstitution process and lead to different proteoliposome performance, by affecting the interaction between lipid and AqpZ, Thickness and charge property of lipid has been found to affect the protein lipid interaction [34, 35]. Zeta potential test shows that DOPG and DOTAP liposomes have strong charge properties (~−30 mV and ~+30 mV respectively) due to phospho group trimethylammonium group respectively, which may induce the difficulty of AqpZ incorporation.

AqpZ to Lipid Ratio and Cholesterol Effect

Figure 13:
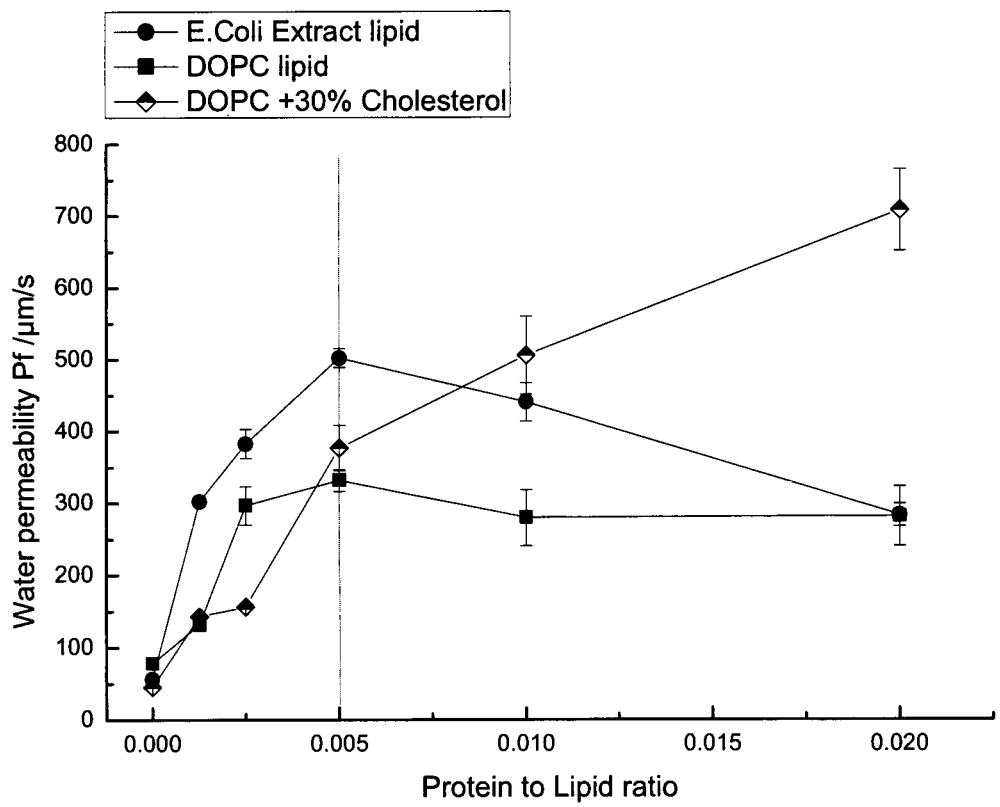
FIG. 13 is a graph showing the results of water permeability tests of E. coli Extract lipids, DOPC lipid, and DOPC Cholesterol (7:3) mixture proteoliposome reconstituted with AquaporinZ at a series of protein to lipid ratio (0, 1:800, 1:400, 1:200, 1:100, and 1:50).

Similar to optimum condition discovered for polymersome [21], optimum AqpZ to lipid mole ratio was also observed for both *E. coli* Extract lipid and DOPC lipid systems shown in FIG. 13. For both lipid systems, proteoliposome reached highest water permeability when protein to lipid ratio was 1:200.

Once over certain ratio, resulting proteoliposomes show lower permeabilities. This may be due to more defects appearing when more protein was incorporated. It was found that after mixing 30% Cholesterol with DOPC lipid, liposomes' permeability becomes reduced by almost 40%, from 76 pm/s to 45 pm/s, which agree with previous report [36]. However, we found that the water permeability of proteoliposomes keeps increasing with increasing AqpZ to lipid ratio. It's known that cholesterol admixing may increase the stiffness of the lipid bilayer, changing bending elasticity and lipid bilayer packing [23, 24, 25, 28, 37] and could enhance the interaction or attraction between lipid bilayer and AqpZ [28]. We assume, in this mixture system, that cholesterol effectively helps to reduce possible defects caused by high protein to lipid ratio, and surprisingly evenincreasethe overall permeability. Thus, the addition of about 30% cholesterol to the amphiphilic lipid when preparing AqpZ proteoliposomes for incorporation in the TFC membranes of the invention may be an advantage when very high water flux is desirable.

Concentration Polarization Mechanisms

Permeability of DOPC liposome and proteoliposome were characterized by stopped flow, using a series of different osmolarity NaCl and sucrose solution as draw solution. For liposome, the rate constant k is linearly related with osmolarity gradient Δosm, which is well described by Equation 1. This also suggested the SD mechanism well describe the water permeability of liposome [34]. However, for the proteoliposome, only at low osmolarity gradient sucrose solution condition (<0.2 osmol/L), the above equation can be applied. When sucrose concentration was higher than 0.3 osmol/L, a remarkable deviation of K value will appear. The lower k value was possibly due to diluted sucrose draw solution close to bilayer surface. When initially water comes out from vesicle, the surface boundary sucrose is diluted and remains at lower concentration due to poor ability of back diffusion. The viscosity of 600 mM sucrose draw solution has tiny difference with NaCl draw solution, both viscosities between 1.015 to 1.30 Pa·S (Data provided by OLI Analyzer 3.1, OLI Systems. Inc, USA). However, mass diffusion coefficient of sucrose in PBS buffer solution is as low as $4.11 \times 10^{-11}$ m$^2$/s, which is much smaller than NaCl diffusion coefficient. This might be the reason of more severe concentration polarization for sucrose draw solution. So we believe suitable testing condition should be below 0.3 osmol, especially when the species have low diffusion coefficient.

Draw Solute Species Effect

Considering the potential sea water desalination application, the effect of 4 major species present in the sea water, NaCl, MgSO$_4$, Na$_2$SO$_4$ and MgCl$_2$, were studied. For liposome, the majority of all species have negligible effect in DOPC liposome water permeability. However, compared with DOPC liposome, *E. coli* extract lipid liposome was more sensitive to Mg$^{2+}$ and SO$_4^{2-}$, that might be due to the strong negative charge property of *E. coli* extract lipid (zeta potential is around -20 my at pH 7.4 in PBS buffer solution). This value may even reach positive (~1 mv) when mixing liposome and high concentration Mg$^{2+}$ solution. For the proteoliposome, bivalent ion, including Mg$^{2+}$ and SO$_4^{2-}$ can significantly affect the *E. coli* Extract lipid proteoliposome characterization even at very low concentration, 10 mM. NaCl was also able to induce large deviation into the stopped flow characterization results. Compared to *E. coli* Extract lipid, DOPC system can withstand higher concentration Mg$^{2+}$ and SO$_4^{2-}$, although the presence of Mg$^{2+}$ and SO$_4^{2-}$ also make the stopped flow measurement of DOPC proteoliposome more difficult. These ions may affect the AqpZ by influencing the interaction between bilayer and AqpZ or forming complex, combing with bilayer and AqpZ [38].

Mg2+ concentration effect was further studied for both DOPC and *E. coli* extract lipid system. Draw solutions, with 914 mosm/I osmolarity, were different concentration MgCl2 dissolved PBS buffer solutions. Additional sucrose was applied to maintain 914 mosm/I osmolarity of all draw solutions. It was found that for DOPC proteoliposome, Mg2+ had negligible effect on the water permeability within testing conditions, Mg2+ concentration up to 50 mM. However, for *E. coli* extract lipid proteoliposome, Mg2+ was able to induce serious vesicle aggregation within testing time (1 s), when the Mg2+ concentration is more than 5 mM. It has been reported that both Mg2+ and Ca2+ can induce liposome fusion at very low concentration, less than 5 mM by forming various complex with lipids [40]. It is most possible that the Ca2+ may induce more serious problem, based on previous report [41] though Ca2+ was not included in this study. The presence of Mg2+ could make Ca2+ even more efficient in inducing the liposome fusion. Other metal ions may also significantly affect phase or structure of the lipid bilayer [39]. Although it was reported that some membrane protein, to some extent, can enhance the robustness of lipid bilayers after being reconstituted into liposome [40], the AqpZ seems not able to allow *E. coli* extract lipid proteoliposome withstand high concentration of bivalent ions, such as 50 mM Mg2+ solution.

For water filtration processes involving seawater or other water sources having a relatively high concentration of divalent ions it may be advantageous to select a neutral amphiphilic lipid such as DOPC in the preparation of the thin film composite membranes of the inventions in order to avoid undesired interactions. In our current membrane design, the proteoliposomes are embedded in the interfacially polymerized polyamide (PA) film. In our present invention the PA film serves as a protection to the proteoliposomes—not only that the PA film provide sufficient mechanical support, but also that it excludes divalent ions from getting into direct contact with the proteoliposomes as the result of the inherent high rejection of the PA layer and thus providing a further advantage.

Conclusion

Present work systematically studies the effects of the lipid types, draw solute concentration, the protein to lipid ratio, cholesterol mixture, the presence of dissolved ions on the aquaporin-lipid bilayer properties. It shows that, e.g., both *E. coli* extract lipid and DOPC lipid can be applied to create functional bilayer after incorporating AqpZ, providing excellent water permeability. Concentration polarization phenomenon, one of important issues in membrane filtration topic, was likely becoming obvious in the proteoliposome stopped flow measurement when high concentration sucrose solution was used as draw solution. In order to promote the water transport performance, AqpZ to lipid ratio can be optimized. For pure lipid system, optimum AqpZ to lipid ratio may be 1:200. With increasing AqpZ amount defects may appear. In this case, cholesterol addition may be an advantage in maintaining high water flux. The current liposome structures were formed by selfassembly, which in itself may not be strong enough to withstand RO desalination conditions, such as high hydraulic pressure. Thus the incorporation of the liposomes in a thin film composite layer as described in the following examples provides the necessary mechanical strength.

EXAMPLE 2

Figure 5:
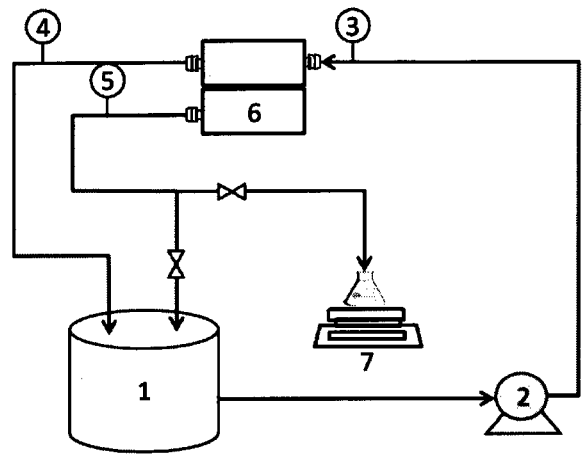
FIG. 5 shows the cross-flow RO setup wherein the intrinsic separation properties of prepared substrate and composite membrane were tested. Membranes were fixed between the top and bottom plates of a testing cell. Feed solution was pumped from the feed tank, flowed against the active layer of membrane and returned to the tank. Permeate was collected and measured the weight and concentration of solute to determine flux and rejection. Cross-flow RO setup for measuring intrinsic separation performance of membrane. (1) Feed tank. (2) Pump. (3), (4) and (5) are pressure transducers for feed, retentate and permeate, respectively. (6) Membrane cell. (7) Balance.

Preparation of a Thin Film Composite Membrane having Incorporated Lipid-AqpZ Vesicles and Testing in RO Setup A commercial UF membrane (MWCO, 50,000 Dalton) was used as substrate, 50 ml aqueous amine solution 1.5 wt. % MPD containing 0.08 mg/g DOPC-AqpZ vesicles was spread onto the surface of the UF membrane substrate, and kept the substrate wet with aqueous solution for 15 min. After that, the aqueous amine solution was removed from the surface and the substrate was vertically standing in the air for 10 min, followed by blowing the surface to remove any possible aggregated vesicles onto the surface with compressed nitrogen gas with at 2 bar for 1 min, then the substrate continued vertically standing dry for another 20 min. Subsequently, a 0.1 w/v % TMC solution was poured on the skin layer of the saturated substrate and reacted for 1 min. The resultant membrane was stored in Milli-Q water till to use. The area of tfc membrane was 200 cm$^2$, which is cut to fit into the test module (42 cm$^2$). The resulting TFC membrane was fixed in the testing cell (6), cf. FIG. 5. Feed solution (500 ppm NaCl) was pumped at 200 psi from the feed tank (1), flowed against the active layer of membrane and returned to the tank. Permeate was collected and the weight was measured on the balance (7) and concentration of solute was determined by conductivity measurement in order to calculate flux and rejection (cf. equations 1 and 2). The water flux and salt rejection of the DOPC-AqpZ vesicles incorporated thin film composite membrane to 500 ppm NaCl (200 psi) was 25.2 L/m$^2$.h and 96.3%, respectively.

EXAMPLE 3

Preparation of a Thin Film Composite Membrane having Incorporated Lipid Vesicles and Testing in RO Setup The composition of the reactive monomer solutions in two phasesand process of interfacial polymerization was similar to Example 2, except, only 0.08 mg/g DOPC vesicles without AqpZ was dissolved in the aqueous amine solution. RO testing was done as in Example 2. And the flux and rejection of the DOPC-AqpZ vesicles incorporated thin film composite membrane to 500 ppm NaCl (200 psi) was 16.9 L/m$^2$.h and 98.5%, respectively. Results from an experiment concerning the comparison of the water flux and solute rejection for thin film composite membrane incorporated with lipid vesicles only or lipid-AqpZ vesicles at increasing pressure up to 200 psiis shown in FIG. 7, which clearly shows that a relatively high water flux can be obtained with incorporation of DOPC vesicles. However, the incorporation of DOPC-AqpZ vesicles significantly improved the water flux of the resultant membranes. Both types of TFC membranes show an initial high and increasing salt rejection which stabilizes at a high level (>98%).

EXAMPLE 4

Preparation of a Thin Film Composite Membrane having Incorporated Lipid-AqpZ Vesicles and Testing in RO Setup The composition of the reactive monomer solution in two phase and process of interfacial polymerization was similar to Example 2, except, 0.16 mg/g DOPC-AqpZ vesicles was dissolved in the aqueous amine solution. RO testing was done as in Example 2. And the flux and rejection of the DOPC-AqpZ vesicles incorporated thin film composite membrane to 500 ppm NaCl (36 psi) was 17.2 L/m$^2$.h and 76.5%, respectively.

EXAMPLE 5

Preparation of a Thin Film Composite Membrane having Incorporated Copolymer-AqpZ Vesicles and Testing in RO Setup The composition of the reactive monomer solution in two phase and process of interfacial polymerization was similar to Example 2, except, in the aqueous amine solution, 0.08 mg/g (PMOXA$_{15}$-PDMS$_{67}$-PMOXA$_{15}$polymersome—AqpZ vesicles was dissolved in the aqueous amine solution. RO testing was done as in Example 2.And the flux and rejection of the polymersome-AqpZ vesicles incorporated thin film composite membrane to 500 ppm NaCl (200 psi) was 36.5 L/m$^2$.h and 95.2%, respectively.

EXAMPLE 6

Preparation of a Thin Film Composite Membrane having Incorporated Copolymer Vesicles and Testing in RO Setup The composition of the reactive monomer solution in two phase and process of interfacial polymerization was similar to Example 5, except in the aqueous amine solution, only 0.08 mg/g (PMOXA$_{15}$-PDMS$_{67}$-PMOXA$_{15}$) copolymervesicles without AqpZ was dissolved in the aqueous amine solution. RO testing was done as in Example 2. And the flux and rejection of the polymeric vesicles incorporated thin film composite membrane to 500 ppm NaCl (200 psi) was 17.2 L/m².h and 93.3%, respectively. Results from an experiment concerning the comparison of the water flux and solute rejection for thin film composite membrane incorporated with copolymer vesicles only or polymersome-AqpZ vesicles at increasing pressure up to 200 psiis shown in FIG. 8. In this experiment we obtained the same high water flux for TFC membranes with incorporated polymer vesicles as for TFC membranes incorporated with lipid vesicles in Example 3. However, the incorporation of polymersome-AqpZinto the thin film composite membrane significantly enhanced the membrane water flux without compromising the salt rejection.

EXAMPLE 7

Casting of a Polysulfone UF Membrane and using it for Preparation of Thin Film Composite Membranes having Incorporated Lipid Vesicles or Lipid-AqpZ Vesicles A polysulfone ultrafiltration membranewas casted in-house with a polymer dope (16 wt. % polysulfone, 5 wt. % polyethylene glycol (molecular weight=600 Da), 2 wt. % LiCl, and 77 wt. % N-methyl-2-pyrrolidone). This ultrafiltration membrane wasused as substrate for subsequent membrane preparation. A 50 ml aqueous amine solution 1 wt. % MPD containing 0.08 mg/g DOPC or DOPC-Aqpz vesicles was spread onto the surface of the UF membrane substrate, and the substrate was kept wet /with aqueous solution for 10 min. After that, the aqueous amine solution was removed from the surface and the substrate was kept horizontally in the air for 30 min, followed by blowing the surface with compressed nitrogen gas at 2 bar for 1 min to remove the excessive liquid. The rest procedureswere the same as those in Example 2. The resulting membranes were tested at 5 bar (74 psi).The membrane water permeabilities for the blank membrane (without DOPC or DOPC-AqpZ), the DOPC containing membrane, and DOPC-AqpZ containing membrane were 3.16±0.07, 3.34±0.29, and 3.92±0.34 L/m².h, respectively. The inclusion of AqpZ had significantly enhanced the water permeability. FIG. 1 shows the scanning electron micrographs(SEM) of the cross-sections of microporous substrates used for AQP based thin film composite membranes: (a) commercial UF membrane (polysulfone) . manufactured by Dow (Dow Water & Process Solutions), and (b) home-made UF membrane (polysulfone).

REFERENCES, THE SUBJECT MATTER OF WHICH IS INCORPORATED HEREIN BY REFERENCE

[1] I. C. Karagiannis, Soldatos, P. G., Water desalination cost literature: review and assessment, Desalination, 223 (2008) 448-456.
[2] M. Kumar, Grzelakowski, M. I Zilles, J., Clark, M., Meier, W., Highly permeable polymeric membranes based on the incorporation of the functional water channel protein Aquaporin Z, PANS, 104 (2007) 20719-20727.
[3] H. Wang, Chung, T. S., Tong, Y. W., Meier, W., Chen, Z., Hong, M., Jeyaseelan, K., Armugam, A., Preparation and characterization of pore-suspending biomimetic membranes embedded with aquaporin Z on carboxylated polyethylene glycol polymer cushion, Soft Matter, In press (2011).
[4] C. D. Montemagno, Schmidt, J. J., Tozzi, S.P., Biomimetic membranes, U.S. Pat. No. 7,208,089 B2 (2007).
[5] P. H. Jensen, Keller, D., Nielsen, C. H., Membrane for filtering of water, U.S. Pat. No. 7857978 (2010).
[6] C. H. Nielsen, Biomimetic membranes for sensor and separation applications Anal. Bioanal. Chem., 395 (2009) 697-718.
[7] T. J. J. D. Wong, J. Schmidt, Single molecule measurements of channel proteins incorporated into biomimetic polymer membranes, Nanotechnology, 17 (2006) 3710-3717.
[8] P. Agre, The aquaporins, blueprints for cellular plumbing system, J. Biol. Chem, 273 (1998) 14659-14662.
[9] S. N. M. Borgnia, A. Engle, P. Agre, Cellular and molecular biology of the aquaporin water channels, Annu. Rev. Biochem., 68 (1999) 425-458.
[10] M. Y. D. Kozono, L. S. King, P. Agre, Aquaporin water channels: atomic structure and molecular dynamics meet clinical medicine, J. Clin. Invest., 109 (2002) 1395-1399.
[11] N. M. T. J. Jeon, J.J. Schmidt, Hydrogel-encapsulated lipid membranes, J. Am. Chem. Soc., 128 (2006) 42-43.
[12] K. B. S. A. Gonzalez-Perez, T. Vissing, C. H. Nielsen, O. G. Mouritsen, Biomimetic triblock copolymer membrane arrays: a stable template for functional membrane proteins, Langmuir, 25 (2009) 10447-10450.
[13] K. B. S. S. Iragimova, P. Szewczykowski, M. Perry, H. Bohr, C.H. Nielsen, Hydrogels for insitu encapsulation of biomimetic membrane arrays, Polym. Adv. Technol., 21 (2010) 1-8.
[14] A. B. Y. Kaufman, V. Freger, Supported lipid bilayer membranes for water purification by reverse osmosis, Langmuir, 26 (2010) 7388-7395.
[15] A. Achilli, T. Y. Cath, E. A. Marchand, A. E. Childress, The forward osmosis membrane bioreactor: A low fouling alternative to MBR processes, Desalination, 239 (2009) 10-21.
[16] J. R. McCutcheon, R. L. McGinnis, M. Elimelech, A novel ammonia—carbon dioxide forward (direct) osmosis desalination process, Desalination, 174 (2005) 1-11.
[17] C. R. Martinetti, A. E. Childress, T. Y. Cath, High recovery of concentrated RO brines using forward osmosis and membrane distillation, Journal of Membrane Science, 331 (2009) 31-39.
[18] M. I. Dova, K. B. Petrotos, H. N. Lazarides, On the direct osmotic concentration of liquid foods. Part I: Impact of process parameters on process performance, Journal of Food Engineering, 78 (2007) 422-430.
[19] M. I. Dova, K. B. Petrotos, H. N. Lazarides, On the direct osmotic concentration of liquid foods: Part II. Development of a generalized model, Journal of Food Engineering, 78 (2007) 431-437.
[20] J. B. Mario, K. David, P. Agre, Functional Reconstitution and Characterization of AqpZ, the E. coli Water Channel Protein, J. Mol. Biol (1999).
[21] M. Kumar, M. Grzelakowski, J. Zilles, M. Clark, W. Meier, Highly permeable polymeric membranes based on the incorporation of the functional water channel protein Aquaporin Z, PNAS 104 (2007) 6.

[22] X. Li, R. Wang, C. Tang, A. Vararattanavech, Y. Zhao, J. Torres, T. Fane, Preparation of Supported Lipid Membranes for Aquaporin Z Incorporation, Colloids and Surfaces B: Biointerfaces (2012).

[23] Z. Chen, R.P. Rand, The Influence of Cholesterol on Phospholipid Membrane Curvature and Bending Elasticity, Biophysical Journal 73 (1997) 10.

[24] D. K. Singh, T.-P. Shentu, I. Levitan, Cholesterol regulates prokaryotic Kir channel by direct binding to channel protein, Biochimica et Biophysica Acta 1808 (2011) 7.

[25] J. W. O'Connor, J. B. Klauda, Lipid Membranes with a Majority of Cholesterol: Applications to the Ocular Lens and Aquaporin 0, The Journal of Physical Chemistry B 115 (2011) 10.

[26] M. C. Woodle, D. Papahadjopoulos, Liposome preparation and size characterization, Methods in Enzymology (1989) 25.

[27] C. M., Designing novel pH-sensitive non-phospholipid vesicle : Characterization and cell interaction, european journal of pharmaceutical sciences (2005).

[28] J. S. Hansen, V. Ardcharaporn, P. Ines, J.G. Per, B. Julie, T. Jaume, E. Jenny, C.H. Nielsen, Interaction between sodium dodecyl sulfate and membrane reconstituted aquaporins: A comparative study of spinach SoPIP2;1 and E. coli AqpZ, Biochimica et Biophysica Acta 1808 (2011) 8.

[29] G. Petzold, V. Dutschk, M. Mende, R. Miller, Interaction of cationic surfactant and anionic polyelectrolytes in mixed aqueous solutions, Colloids and Surfaces A: Physicochem. Eng. 319 (2007) 8.

[30] A.-K. Meinild, D. A. Klaerke, T. Zeuthen, Bidirectional Water Fluxes and Specificity for Small Hydrophilic Molecules in Aquaporins 0-5, Journal of Biological Chemistry 273 (1998) 6.

[31] S. Scheuring, P. Ringler, M. Borgnia, H. Stahlberg, D.J.M. Iler, P. Agre, A. Engel, High resolution AFM topographs of the *Escherichia coli* water channel aquaporin Z, The EMBO Jounal 18 (1999) 7.

[32] J. C. Mathai, S. Tristram-Nagle, J. F. Nagle, M. L. Zeidel, Structural Determinants of Water Permeability through the Lipid Membrane, The Journal of General Physiology 131 (2008) 8.

[33] N. T. Hovijitra, J. J. Wuu, B. Peaker, J. R. Swartz, Cell-Free Synthesis of Functional Aquaporin Z in Synthetic Liposomes, Biotechnology and Bioengineering 104 (2009) 10.

[34] Z. Wang, J. Bai, Y. Xu, The effect of charged lipids on bacteriorhodopsin membrane reconstitution and its photochemical activities, Biochemical and Biophysical Research Communications 371 (2008) 4.

[35] L. B. Li, I. Vorobyov, T. W. Allen, The role of membrane thickness in charged protein—lipid interactions, Biochimica et Biophysica Acta (2011) 11.

[36] A. Mflon, Y. Nakatam, Osmotic swelling of unilameilar vesicles by the stopped-flow light scattering method. Influence of vesicle size, solute, temperature, cholesterol and three a,w-dihydroxycarotenoids, Biochimica et Biophysica Acta 859 (1986) 9.

[37] T. T. Mills, J. Huang, G. W. Feigenson, J. F. Nagle, Effects of cholesterol and unsaturated DOPC lipid on chain packing of saturated gel-phase DPPC bilayers, Gen Physiol Biophys 28 (2009) 14.

[38] D. Huster, K. Gawrisch, Water Permeability of Polyunsaturated Lipid Membranes Measured by 170 NMR, Biophysical Journal 73 (1997) 10.

[39] D. CHAPMAN, W. E. PEEL, B. KINGSTON, T. H. LILLEY, LIPID PHASE TRANSITIONS IN MODEL BIOMEMBR2OANES THE EFFECT OF IONS ON PItOSPHATIDYLCHOLINE BILAYERS, Biochimica et Biophysica Acta 464 (1977) 16.

[40] A. Portis, C. Newton, W. Pangborn, D. Papahadjopoulos, Studies on the Mechanism of Membrane Fusion: Evidence for an Intermembrane Ca2+-Phospholipid Complex, Synergism with Mg2+, and Inhibition by Spectrin, Biochemistry (1979) 11.

[41] K. Jacobson, D. Papahadjopoulos, Phase Transitions and Phase Separations in Phospholipid Membranes Induced by Changes in Temperature, pH, and Concentration of Bivalent Cations', Biochemistry 14 (1975) 10.

The invention claimed is:

1. A thin film composite membrane comprising:

a microporous substrate;

a thin selective layer supported by the microporous substrate, wherein the thin selective layer incorporates amphiphilic vesicles formed from lipids and the amphiphilic vesicles are immobilized in the thin selective layer within a polyamide film, wherein said lipids consist of DPhPC (1,2-diphytanoyl-sn-glycero-3-phosphocholine) and/or DOPC (1,2-dioleoyl-sn-glycero-3-phosphocholine), wherein said amphiphilic vesicles contain aquaporin water channels and further comprise cholesterol in the range of more than 30 molar % and up to 40 molar % of the volume of the lipids, wherein said aquaporin water channels are present in a protein to lipid molar ratio in the range of from about 1:20 to about 1:500, wherein the thin selective layer is configured to exclude divalent ions in water from getting into direct contact with the amphiphilic vesicles containing the aquaporin water channels; and a coating layer on the thin selective layer, wherein the coating layer consists of a hydrogel, wherein the hydrogel consists of polyvinylpyrrolidone (PVP), wherein the thin film composite membrane is able to withstand a high pressure of 200 psi.

2. The thin film composite membrane of claim 1, wherein said thin selective layer is formed through the interfacial polymerization of an aqueous solution of an amine with a solution of an acid chloride in an organic solvent, and wherein amphiphilic aquaporin vesicles are incorporated in said aqueous solution.

3. The thin film composite membrane according to claim 2, wherein said amine is meta-phenylenediamine, said acid chloride is trimesoylchloride, and said organic solvent is n-hexane or cyclohexane.

4. The thin film composite membrane according to claim 1, wherein said aquaporin water channels are functional natural or synthetic aquaporin or aquaglyceroporin water channels.

5. The thin film composite membrane according to claim 4 wherein said aquaporin water channels are aquaporin Z (AqpZ), GlPf (an E. coli glycerol facilitator), SoPIP2;1 (a plant aquaporin), aquaporin 1, or aquaporin 2.

6. The thin film composite membrane according to claim 1, wherein said microporous substrate is selected from the group consisting of polysulfone and polyethersulfone membranes.

7. A process of preparing the thin film composite membrane of claim 1 through interfacial polymerization, comprising the steps of:

providing a suitable microporous support membrane;

applying an aqueous mixture of amine solution and concentrated vesicles solution having incorporated aquaporins to at least one surface of said microporous support membrane to allow soaking of said microporous support membrane, wherein said vesicles solution contains aquaporin water channels and further comprises cholesterol in the range of more than 30 molar % and up to 40 molar % of the lipid volume, wherein said lipids consist of DPhPC (1,2-diphytanoyl-sn-glycero-3-phosphocholine) and/or DOPC (1,2-dioleoyl-sn-glycero-3-phosphocholine), and wherein said aquaporin water channels are present in a protein to lipid molar ratio in the range of from about 1:20 to about 1:500;

applying an acyl chloride solution in an organic solvent to said soaked membrane to obtain a formation of a thin polyamide layer having immobilized vesicles, wherein the thin polyamide layer is configured to exclude divalent ions in water from getting into direct contact with the immobilized vesicles containing the aquaporin water channels; and applying a coating layer on the thin polyamide layer to form a hydrogel thereon, wherein the hydrogel consists of polyvinylpyrrolidone (PVP).

8. The process according to claim 7, wherein said amine is meta-phenylenediamine and wherein said acyl chloride is trimesoyl chloride.

9. A process comprising: filtering water through a thin film composite membrane of claim 1 by an osmosis process.

10. The process of claim 9 wherein the osmosis process is forward osmosis, reverse osmosis or pressure retarded osmosis.

* * * * *